United States Patent
Nadella et al.

(10) Patent No.: US 10,029,401 B2
(45) Date of Patent: *Jul. 24, 2018

(54) MULTI-LAYERED FOAMED POLYMERIC OBJECTS AND RELATED METHODS

(75) Inventors: Krishna Nadella, Seattle, WA (US); Gregory Branch, Camano Island, WA (US); Vipin Kumar, Seattle, WA (US); Michael Waggoner, Seatte, WA (US)

(73) Assignees: Dart Container Corporation, Mason, MI (US); The University of Washington, Seattle, WA (US)

( * ) Notice: Subject to any disclaimer, the term of this patent is extended or adjusted under 35 U.S.C. 154(b) by 771 days.

This patent is subject to a terminal disclaimer.

(21) Appl. No.: 13/616,892

(22) Filed: Sep. 14, 2012

(65) Prior Publication Data

US 2013/0065981 A1   Mar. 14, 2013

Related U.S. Application Data

(63) Continuation of application No. 12/898,106, filed on Oct. 5, 2010, now Pat. No. 8,377,548, which is a
(Continued)

(51) Int. Cl.
*B29C 44/06* (2006.01)
*B32B 5/32* (2006.01)
(Continued)

(52) U.S. Cl.
CPC .......... *B29C 44/06* (2013.01); *B29C 44/0415* (2013.01); *B29C 44/0461* (2013.01);
(Continued)

(58) Field of Classification Search
CPC . B29C 44/04; B29C 44/0415; B29C 44/0461; B29C 44/0484; B29C 44/06
(Continued)

(56) References Cited

U.S. PATENT DOCUMENTS

| 1,948,568 | A | 2/1934 | Faber |
| 2,224,997 | A | 12/1940 | Weisse |

(Continued)

FOREIGN PATENT DOCUMENTS

| CA | 2012985 A1 | 9/1991 |
| EP | 0329490 A2 | 8/1989 |

(Continued)

OTHER PUBLICATIONS

Singh et al. Generation of porous microcellular 85/15 poly(dl-lactide-co-glycolide) foams for biomedical applications. Biomaterials 25 (2004) 2611-2617.*

(Continued)

*Primary Examiner* — Atul P. Khare
(74) *Attorney, Agent, or Firm* — McGarry Bair PC

(57) ABSTRACT

The invention disclosed herein relates to relates to foamed thermoplastic material objects and articles of manufacture having an internal layered cellular structure, as well as to methods of making the same. In one embodiment, the invention is directed to a multi-layer foamed polymeric article of manufacture, comprising: a non-laminated multi-layer thermoplastic material sheet, wherein the multi-layer thermoplastic material sheet has first and second discrete outer layers sandwiching a plurality of discrete inner foamed layers, and wherein the two outer layers and plurality discrete inner foamed layers are integral with one another. The thermoplastic material may be a semi-crystalline polymer such as, for example, PET (polyethylene terephthalate), PEEK (polyetheretherketone), PEN (polyethylene naphthalate), PBT (polybutylene terephthalate), PMMA (polymethyl methacrylate), PLA (polylactide), polyhydroxy acid (PHA), thermoplastic urethane (TPU), or blends thereof. The two outer layers may be unfoamed skin layers having (Continued)

smooth outer surfaces, and the discrete inner foamed layers may be microcellular.

20 Claims, 13 Drawing Sheets

Related U.S. Application Data continuation of application No. 12/016,118, filed on Jan. 17, 2008, now Pat. No. 7,807,260.

(60) Provisional application No. 60/886,506, filed on Jan. 24, 2007, provisional application No. 60/885,374, filed on Jan. 17, 2007.

(51) Int. Cl.
  *B29C 44/04* (2006.01)
  *B29C 44/34* (2006.01)
  *B32B 27/06* (2006.01)
  *B29L 31/00* (2006.01)

(52) U.S. Cl.
  CPC ...... *B29C 44/0484* (2013.01); *B29C 44/3415* (2013.01); *B29C 44/3446* (2013.01); *B29C 44/3453* (2013.01); *B29C 44/3473* (2013.01); *B32B 5/32* (2013.01); *B32B 27/06* (2013.01); *B29L 2031/7132* (2013.01); *Y10T 428/1376* (2015.01); *Y10T 428/2495* (2015.01); *Y10T 428/24628* (2015.01); *Y10T 428/24992* (2015.01); *Y10T 428/24998* (2015.04); *Y10T 428/249961* (2015.04); *Y10T 428/249976* (2015.04); *Y10T 428/249977* (2015.04); *Y10T 428/249978* (2015.04); *Y10T 428/249979* (2015.04); *Y10T 428/249981* (2015.04); *Y10T 428/249989* (2015.04)

(58) Field of Classification Search
  USPC .......................................................... 264/51
  See application file for complete search history.

(56) References Cited

U.S. PATENT DOCUMENTS

| | | |
|---|---|---|
| 2,317,448 A | 4/1943 | Dreyfus |
| 2,629,312 A | 2/1953 | Davis |
| 2,755,029 A | 7/1956 | Speed et al. |
| 2,917,217 A | 12/1959 | Sisson |
| 3,217,845 A | 11/1965 | Reynolds et al. |
| 3,244,537 A | 4/1966 | Cease |
| 3,260,781 A | 7/1966 | Lux |
| 3,364,519 A | 1/1968 | Pitsch |
| 3,557,265 A | 1/1971 | Chrisholm |
| 3,610,000 A | 10/1971 | Lopata |
| 3,617,311 A | 11/1971 | Beltle |
| 3,744,402 A | 7/1973 | Piegza |
| 3,803,332 A | 4/1974 | Sieferth |
| 3,836,624 A | 9/1974 | Ferris |
| 3,845,915 A | 11/1974 | Schmidt et al. |
| 3,846,526 A | 11/1974 | Wade |
| 3,883,625 A | 5/1975 | Thomas |
| 3,895,911 A | 7/1975 | Prins |
| 3,923,556 A | 12/1975 | Iszczukiewicz |
| 3,937,777 A | 2/1976 | Wienand |
| 3,955,482 A | 5/1976 | Moen |
| 3,978,260 A | 8/1976 | Dobbins et al. |
| 4,003,184 A | 1/1977 | Shiu |
| 4,003,302 A | 1/1977 | Mencacci |
| 4,059,660 A | 11/1977 | Roth |
| 4,074,941 A | 2/1978 | Jablonski |
| 4,188,432 A | 2/1980 | Holden |
| 4,284,596 A | 8/1981 | Inokuchi |
| 4,304,747 A | 12/1981 | Lake |
| 4,335,606 A | 6/1982 | Michalak |
| 4,386,188 A | 5/1983 | Grancio |
| 4,424,287 A | 1/1984 | Johnson |
| 4,456,571 A | 6/1984 | Johnson |
| 4,473,665 A | 9/1984 | Martini-Vvendensky |
| D277,632 S | 2/1985 | Staufenberg |
| 4,511,520 A | 4/1985 | Bowen |
| 4,552,789 A | 11/1985 | Winchell |
| 4,608,009 A | 8/1986 | Whiteside |
| 4,616,991 A | 10/1986 | Bach et al. |
| 4,632,862 A | 12/1986 | Mullen et al. |
| 4,673,695 A | 6/1987 | Aubert |
| 4,693,856 A | 9/1987 | Rubens |
| 4,756,091 A | 7/1988 | Van Denend |
| 4,761,256 A | 8/1988 | Hardenbrook |
| 4,848,543 A | 7/1989 | Doboze |
| 4,886,563 A | 12/1989 | Bennett |
| 4,894,248 A | 1/1990 | Pappas |
| 4,911,869 A | 3/1990 | Meyer |
| 4,981,631 A | 1/1991 | Cheung |
| 5,047,280 A | 9/1991 | Bach |
| 5,128,202 A | 7/1992 | Subramian |
| 5,145,107 A | 9/1992 | Silver |
| 5,158,986 A | 10/1992 | Cha |
| 5,160,674 A | 11/1992 | Colton |
| 5,172,443 A | 12/1992 | Christ |
| 5,182,307 A | 1/1993 | Kumar |
| 5,207,008 A | 5/1993 | Wimburger |
| 5,217,660 A | 6/1993 | Howard |
| 5,223,545 A | 6/1993 | Kumar |
| 5,303,484 A | 4/1994 | Hagen |
| 5,334,356 A | 8/1994 | Baldwin |
| 5,362,436 A | 11/1994 | Wagner |
| 5,364,696 A | 11/1994 | Wagner |
| 5,369,135 A | 11/1994 | Campbell |
| 5,437,846 A | 8/1995 | Roumagnac |
| 5,484,640 A | 1/1996 | Mullen et al. |
| 5,589,243 A | 12/1996 | Day |
| 5,640,784 A | 6/1997 | Rochelau |
| 5,684,055 A | 11/1997 | Kumar |
| 5,723,510 A | 3/1998 | Kabumoto |
| 5,747,085 A | 5/1998 | Veltman |
| 5,783,610 A | 7/1998 | Fukushima |
| 5,792,295 A | 8/1998 | Huebmer |
| 5,835,657 A | 11/1998 | Suarez |
| 5,844,731 A | 12/1998 | Kabumoto |
| 5,846,582 A | 12/1998 | Mayfield |
| 5,867,920 A | 2/1999 | Rogne |
| 5,894,046 A | 4/1999 | Kim |
| 5,904,946 A | 5/1999 | Kemp |
| 5,955,014 A | 9/1999 | Raukola |
| 6,012,583 A | 1/2000 | Ramirez |
| 6,025,049 A | 2/2000 | Ouelette et al. |
| 6,074,678 A | 6/2000 | Blackwelder |
| 6,080,798 A * | 6/2000 | Handa ............... B29C 44/04 264/50 |
| 6,083,580 A | 7/2000 | Finestone et al. |
| 6,102,313 A | 8/2000 | Salzsauler |
| 6,235,380 B1 | 5/2001 | Tupil |
| 6,365,249 B1 | 4/2002 | Al Ghatta |
| 6,403,663 B1 | 6/2002 | DeSimone |
| 6,503,427 B1 * | 1/2003 | Yamamoto ........... B29C 44/348 264/51 |
| D476,861 S | 7/2003 | Zettle |
| 6,656,671 B1 | 12/2003 | Aylward |
| 6,773,791 B1 | 8/2004 | Ruggie et al. |
| 6,884,377 B1 | 4/2005 | Burnham |
| 6,884,823 B1 | 4/2005 | Pierick |
| 6,948,378 B2 | 9/2005 | Solberg |
| 6,979,494 B2 | 12/2005 | Berrier et al. |
| 7,041,187 B2 | 5/2006 | Park et al. |
| 7,083,849 B1 | 8/2006 | Albrecht |
| 7,501,175 B2 | 3/2009 | Branch et al. |
| 2001/0020513 A1 | 9/2001 | Tupil |
| 2001/0032903 A1 | 10/2001 | Durrance |
| 2002/0168509 A1 | 11/2002 | Desimone |
| 2003/0130364 A1 | 7/2003 | Vo |
| 2003/0138570 A1 | 7/2003 | Kaylor et al. |
| 2004/0005449 A1 | 1/2004 | Sugimoto |

(56) References Cited

U.S. PATENT DOCUMENTS

| | | |
|---|---|---|
| 2004/0250628 A1 | 12/2004 | Solberg |
| 2005/0035495 A1 | 2/2005 | Baker |
| 2005/0058824 A1 | 3/2005 | Fujimoto |
| 2005/0115975 A1 | 6/2005 | Smith |
| 2005/0181196 A1 | 8/2005 | Aylward |
| 2005/0203198 A1 | 9/2005 | Branch |
| 2005/0214512 A1 | 9/2005 | Fascio |
| 2005/0233036 A1 | 10/2005 | Feldmeier |
| 2006/0073298 A1 | 4/2006 | Hutchinson |
| 2006/0144915 A1 | 7/2006 | Sadlier |
| 2006/0284331 A1 | 12/2006 | Branch |
| 2008/0207782 A1* | 8/2008 | Jacobs .................... B29C 44/08 521/54 |

FOREIGN PATENT DOCUMENTS

| | | |
|---|---|---|
| EP | 0371392 | 6/1990 |
| EP | 1055499 A1 | 11/2000 |
| EP | 1636008 | 12/2004 |
| EP | 1526093 | 4/2005 |
| GB | 2044672 | 10/1980 |
| JP | 08-174648 | 7/1996 |
| JP | 11-080408 | 3/1999 |
| JP | 11080408 A * | 3/1999 |
| WO | WO9618486 A2 | 6/1996 |
| WO | WO9721377 A2 | 6/1997 |
| WO | WO2001005574 A2 | 1/2001 |
| WO | WO0136521 A2 | 5/2001 |
| WO | WO2004103675 A1 | 12/2004 |
| WO | WO2004103828 A2 | 12/2004 |
| WO | WO2004104072 A2 | 12/2004 |

OTHER PUBLICATIONS

Kumar. Phenomenology of bubble nucleation in the solid-state nitrogen-polystyrene microcellular foams. Colloids and Surfaces A: Physiochem. Eng. Aspects 263 (2005) 336-340.*

Nadella et al. Constrained Solid-State Foaming of Microcellular Panels. Cellular Polymers, vol. 24, No. 2 (2005).*

Nadella et al. Thick Microcellular Thermoplastic Sheets for Construction and other Load-Bearing Applications. International Conference on Thermoplastic Foam. 2004. 10 pages.*

Kumar et al. Production of Thick Microcellular Thermoplastic Sheets. ANTEC 2003. 1722-1726.*

Barlow et al. Impact Strength of High Density Solid-State Microcellular Polycarbonate Foams. Journal of Engineering Materials and Technology. vol. 123. Apr. 2001. 229-233.*

Kumar, Vipin. Process Synthesis for Manufacturing Microcellular Thermoplastic Parts: A Case Study in Axoimatic Design. MIT Department of Engineering. May 1988. pp. 1-162.*

Nadella et al. (Thick Microcellular Thermoplastic Sheets for Construction and Other Load-Bearing Applications. 4th International Conference on Thermoplastic Foam. Foams 2004. pp. 1-11).*

Nadella et al., "Novel Microcellular Plastics for Lightweight and Energy Efficient Building Applications," M. Anson et al. (eds.), Advances in Building Technology, vol. 1, Elsevier Science Ltd., Hong Kong (2002) 121-128.*

International Search Report PCT/US2014/011534 dated May 12, 2014.

Wang, "Solvent-free Fabrication of Porous Polymer for Tissue Engineering Applications," University of Washington, Dept. of Mechanical Engineering (dissertation), 2007.

Kumar, "A model for the unfoamed skin on microcellular foams", 1994, Polymer Engineering & Science 34(3) 169-173 pages.

Holl, "A steady-state mass balance model of the polycarbonate $CO_2$ System", 2001, Journal of Polymer Science Part B, vol. 39 p. 868-880.

Kumar, "A process for making thermoplastic parts", 1990, 30(20), Polymer Engineering and Science, Oct. 1990, p. 1323-1329.

Kumar, "Semi-continuous production of solid state PET foams," Society of Plastics Engineers Conference Proceedings, 1995, vol. II, pp. 2189-2192.

Zhang, "An in situ study of plasticization of polymers by high-pressure gases", 1998, Journal of Polymer Science Part A: polymer chemistry 36(6) p. 977-982.

Arora et al, "Preparation and characteristization of microcellular polystyrene foams processed in supercritical carbon dioxide," Macromolecules 31, p. 4614-4620 (1998).

Yousefpour, "Fusion bonding/welding of thermoplastic composites", Journal of Thermoplastic Composite Materials Jul. 2004 vol. 17 No. 4 303-341.

Goel, "Generation of Microcellular Polymers using Supercritical $CO_2$", Cellular Polymers: Heriot-Watt University, Mar. 23-25, 1993, 1993: p. 25.

Seeler, "Net-shape sintered microcellular foam parts, SPE Technical Papers", vol. XLIII, 1997, pp. 2032-2036.

Young, "Polymer-Solvent Phase Separation as a Route to Low Density, Microcellular Plastic Foams", Journal of Cellular Plastics, 1987. 23(1): p. 55.

Wang et al., "A method for solvent-free fabrication of porous polymer using solid-state foaming and ultrasound and tissue engineering applications," Biomaterials 27 (2006).

Mehta et al, "Prediction of Density Variation in Thick Microcellular Sheets," UW ME Course Project Report Autumn 2003.

Nadella et al, "Prediction of Density Variation in Thick Microcellular Sheets," ANTEC 2004, p. 2610-2614.

Goel et al, "Generation of Microcellular Polymers using Supercritical $CO_2$," Polymer Engineering and Science, Jul. 1994, 34:14 p. 1148; presented at the Cellular Polymers 2nd International Conference, Edinburgh UK; Mar. 1993.

Holl "An in situ study of plasticization of polymers by high-pressure gases", 1998, Journal of Polymer Science Part A: polymer chemistry 36(6) p. 977-982.

* cited by examiner

MULTI-LAYERED FOAMED POLYMERIC OBJECTS AND RELATED METHODS

CROSS-REFERENCE TO RELATED APPLICATIONS

This application is a continuation of U.S. patent application Ser. No. 12/898,106, filed on 5 Oct. 2010, (now U.S. Pat. No. 8,377,548, issued 19 Feb. 2013), which is a continuation of U.S. patent application Ser. No. 12/016,118, filed on 17 Jan. 2008 (now U.S. Pat. No. 7,807,260 issued on 5 Oct. 2010), which claims priority from U.S. Provisional Patent Applications 60/886,506, filed on 24 Jan. 2007, and 60/885,374, filed on 17 Jan. 2007. Each of these patent applications is incorporated herein by reference in their entirety for all purposes.

TECHNICAL FIELD

The present invention relates generally to foamed plastic materials and, more specifically, to microcellular foamed thermoplastic material objects and articles of manufacture having a multi-layered structure, as well as to methods of making the same.

BACKGROUND OF THE INVENTION

Microcellular plastic foam refers to a polymer that has been specially foamed so as to create micro-pores or cells (also sometime referred to as bubbles). The common definition includes foams having an average cell size on the order of 10 microns in diameter, and typically ranging from about 0.1 to about 100 microns in diameter. In comparison, conventional plastic foams typically have an average cell diameter ranging from about 100 to 500 microns. Because the cells of microcellular plastic foams are so small, to the casual observer these specialty foams generally retain the appearance of a solid plastic.

Microcellular plastic foams can be used in many applications such as, for example, insulation, packaging, structures, and filters (D. Klempner and K. C. Fritsch, eds., *Handbook of Polymeric Foams and Foam Technology*, Hanser Publishers, Munich (1991)). Microcellular plastic foams have many unique characteristics. Specifically, they offer good mechanical properties and a reduction on material costs and weights at the same time. This is one of the advantages of microcellular foams over conventional foams in which weight reduction is generally achieved at the expense of reduced mechanical properties. Moreover, in conventional foam production technology, ozone-damaging chloroflourocarbons (CFCs) or hydrochlorofluorocarbons (HCFCs), as well as flammable hydrocarbons are typically used as foaming agents. Microcellular foam processing technology, on the other hand, has the additional advantage of using environmentally friendly foaming agents such as, for example, carbon dioxide and nitrogen.

The process of making microcellular plastic foams has been developed based on a thermodynamic instability causing cell nucleation (J. E. Martini, SM Thesis, Department of Mech. Eng., MIT, Cambridge, Mass. (1981)). First, a polymer is saturated with a volatile foaming agent at a high pressure. Then, by means of a rapid pressure drop, the solubility of foaming agent in the polymer is decreased, and the polymer becomes supersaturated. The system is heated to soften the polymer matrix and a large number of cells are nucleated. The foaming agent diffuses both outwards and into a large number of small cells. Stated somewhat differently, microcellular plastic foam may be produced by saturating a polymer with a gas or supercritical fluid and using a thermodynamic instability, typically a rapid pressure drop, to generate billions of cells per cubic centimeter (i.e., bubble density of greater than 108 cells per cubic centimeter) within the polymer matrix.

There are several patents and patent publications that disclose various aspects of microcellular plastic foam and processes for making the same. Exemplary in this regard are the following:

U.S. Pat. No. 4,473,665 to Martini-Vvedensky et al. (issued Sep. 25, 1984) discloses microcellular plastic foams and related methods. In this patent, a batch process is disclosed in which a plastic sheet or other article is impregnated with an inert gas under pressure; the pressure is reduced to ambient; the plastic sheet or article is heated to a softening point to initiate bubble nucleation and foaming; and when the desired degree of foaming has been achieved, the plastic sheet or article is quenched to terminate foaming. The resulting product is a microcellular plastic foam having uniformly distributed cells all of about the same size.

U.S. Pat. No. 4,761,256 to Hardenbrook et al. (issued Mar. 1, 1998) discloses a process in which a web of plastic material is impregnated with an inert gas and the gas is diffused out of the web in a controlled manner. The web is reheated at a station external to the extruder to induce foaming, wherein the temperature and duration of the foaming process is controlled so as to produce uniformly distributed cells. The process is designed to provide for the continuous production of microcellular foamed plastic sheet.

U.S. Pat. No. 5,158,986 to Cha et al. (issued Oct. 27, 1992) discloses the formation of microcellular plastic foams by using a supercritical fluid as a blowing agent. In a batch process, a plastic article is submerged at pressure in a supercritical fluid for a period of time, and then quickly returned to ambient conditions so as to create a solubility change and nucleation. In a continuous process, a polymeric sheet is extruded, which can be run through rollers in a container of supercritical fluid at pressure, and then exposed quickly to ambient conditions. In another continuous process, a supercritical fluid-saturated molten polymeric stream is established. The polymeric stream is rapidly heated, and the resulting thermodynamic instability (solubility change) creates sites of nucleation (while the system is maintained under pressure to prevent significant cell growth). The polymeric stream is then injected into a mold cavity where pressure is reduced and cells are allowed to grow.

U.S. Pat. No. 5,684,055 to Kumar et al. (issued Nov. 4, 1997) discloses a method for the semi-continuous production of microcellular foam articles. In a preferred embodiment, a roll of polymer sheet is provided with a gas channeling means interleaved between the layers of polymer. The roll is exposed to a non-reacting gas at elevated pressure for a period of time sufficient to achieve a desired concentration of gas within the polymer. The saturated polymer sheet is then separated from the gas channeling means and bubble nucleation and growth is initiated by heating the polymer sheet. After foaming, bubble nucleation and growth is quenched by cooling the foamed polymer sheet.

Although much progress has made with respect to the development of microcellular foamed thermoplastic material objects and articles of manufacture, there is still a need in the art for new and different types of foamed plastic materials. The present invention fulfills these needs and provides for further related advantages.

SUMMARY OF THE INVENTION

In brief, the present invention relates to foamed thermoplastic material objects and articles of manufacture having an internal layered cellular structure, as well as to methods of making the same. In one embodiment, the invention is directed to a multi-layer foamed polymeric article of manufacture, comprising: a non-laminated multi-layer thermoplastic material sheet, wherein the multi-layer thermoplastic material sheet has first and second discrete outer layers sandwiching a plurality of discrete inner foamed layers, and wherein the two outer layers and plurality discrete inner foamed layers are integral with one another. The thermoplastic material may be a semi-crystalline polymer such as, for example, PET (polyethylene terephthalate), PEEK (polyetheretherketone), PEN (polyethylene naphthalate), PBT (polybutylene terephthalate), PMMA (polymethyl methacrylate), PLA (polylactide), polyhydroxy acid (PHA), thermoplastic urethane (TPU), or blends thereof. In this embodiment, the two outer layers may be unfoamed skin layers having smooth outer surfaces, and the discrete inner foamed layers may be microcellular.

In another embodiment, the invention is directed to a method for making a multi-layer foamed polymeric object (such as, for example, a cup or tray) from a solid monolithic thermoplastic material sheet, the thermoplastic material sheet having a first bulk crystallinity level, the method comprising: absorbing an effective amount of a plasticizing gas into the thermoplastic material sheet to yield a reversibly plasticized thermoplastic material sheet, the plasticized thermoplastic material sheet being impregnated with the plasticizing gas and having a second bulk crystallinity level that is greater than the first bulk crystallinity level; desorbing at least some of the plasticizing gas from the plasticized thermoplastic material sheet; heating the plasticized thermoplastic material sheet to yield a foamed thermoplastic material sheet, the foamed thermoplastic material sheet having a third bulk crystallinity level that is greater than or equal to the second bulk crystallinity level; and forming or thermoforming the foamed thermoplastic material sheet to yield the multi-layer foamed polymeric object, the multi-layer foamed polymeric object having a fourth bulk crystallinity level that is greater than or equal to the third bulk crystallinity level.

In yet another embodiment, the invention is directed to a method for making a shaped multi-layer foamed polymeric article of manufacture (such as, for example, a cup or tray) from a solid monolithic thermoplastic material sheet, wherein the thermoplastic material sheet has a first bulk crystallinity level. In this embodiment, the method comprises at least the following steps: absorbing a plasticizing gas into the thermoplastic material sheet, the step of absorbing occurring at a first selected pressure, temperature, and period of time sufficient to yield a reversibly plasticized thermoplastic material sheet, the plasticized thermoplastic material sheet being impregnated with the plasticizing gas and having a second bulk crystallinity level that is greater than the first bulk crystallinity level; desorbing at least some of the plasticizing gas from the plasticized thermoplastic material sheet; heating and mechanically stretching the plasticized thermoplastic material sheet to thereby initiate foaming, the step of heating and mechanically stretching occurring by transferring a selected amount of heat energy from a heat source sufficient to yield a foamed thermoplastic material sheet, the foamed thermoplastic material sheet having a third bulk crystallinity level that is greater than the first and second bulk crystallinity levels; and thermoforming the foamed thermoplastic material sheet in a thermoformer to yield the shaped multi-layer foamed polymeric article of manufacture, the multi-layer foamed polymeric article of manufacture having a fourth bulk crystallinity level that is greater than the first, second, and third bulk crystallinity levels. The method may further comprise the step of heat-setting the shaped multi-layer foamed polymeric article of manufacture, while in the thermoformer, to thereby further increase the bulk crystallinity of the shaped multi-layer foamed polymeric article of manufacture to a fifth bulk crystallinity level, wherein the fifth bulk crystallinity level is greater than the first, second, third, and fourth bulk crystallinity levels.

These and other aspects of the present invention will become more evident upon reference to the following detailed description and attached drawings. It is to be understood, however, that various changes, alterations, and substitutions may be made to the specific embodiments disclosed herein without departing from their essential spirit and scope. In addition, it is expressly provided that all of the various references cited herein are incorporated herein by reference in their entireties for all purposes.

BRIEF DESCRIPTION OF THE DRAWINGS

In the drawings like reference numerals are used to designate like features throughout the several views of the drawings. In addition, it should be noted that because the partial cross-sectional views were obtained by "scoring" a sample coupon, and then breaking the sample coupon along the indented score line, an artifact denoted by the symbol A is present. Artifact A is not a separate layer; rather, it is the result of having a non-planar portion of the cross-sectional view corresponding to the depth of the score line.

DETAILED DESCRIPTION OF THE INVENTION

The present invention is directed to multi-layer foamed polymeric objects and articles of manufacture, as well as to related methods for making the same. In the several embodiments disclosed herein, the multi-layer foamed polymeric objects and articles of manufacture are described in the context of transforming a solid monolithic sheet of a PET (polyethylene terephthalate) thermoplastic material; however, it is to be understood that other semi-crystalline polymers such as, for example, PEEK (polyetheretherketone), PEN (polyethylene naphthalate), PBT (polybutylene terephthalate), PMMA (polymethyl methacrylate), and PLA (polylactide), polyhydroxy acid (PHA), thermoplastic urethane (TPU), as well as various polymeric blends thereof, are contemplated and within the scope of the invention. In addition, and as appreciated by those skilled in the art, PET is understood to be inclusive of both RPET (recycled polyethylene terephthalate) and CPET (crystallizing polyethylene terephthalate).

Figure 1:
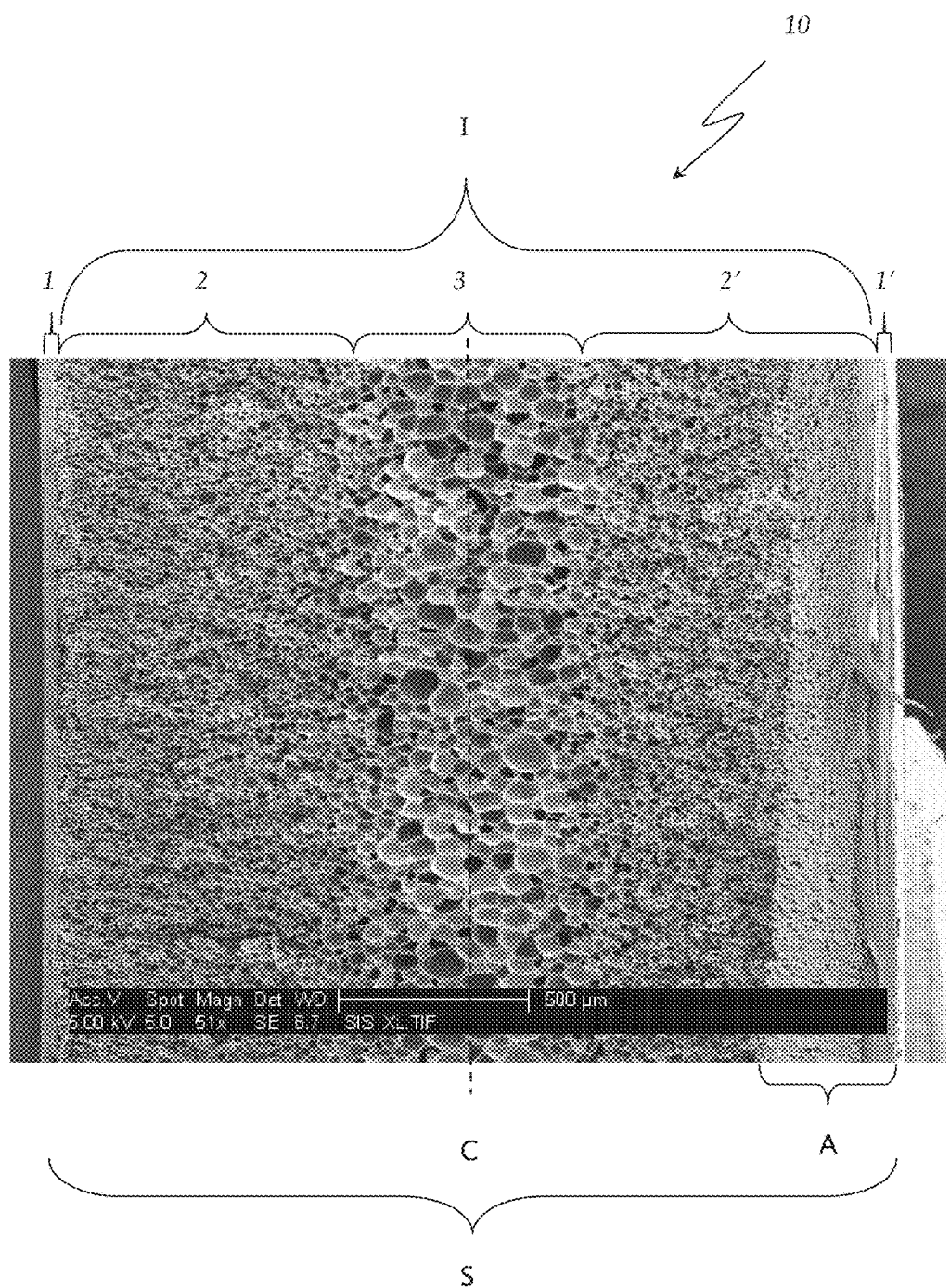
FIG. 1 is a scanning electron micrograph showing a partial cross-sectional view of a thermoformed circular coupon of RPET (3.8 cm diameter×0.107 cm) exhibiting a multi-layer foamed structure in accordance with an embodiment of the present invention.

Thus, and in view of foregoing and with reference to FIG. 1, the invention in one embodiment is directed to a multi-layer foamed polymeric article of manufacture 10 made from a solid monolithic sheet of a semi-crystalline polymer; namely, PET. As shown, the multi-layer foamed polymeric article of manufacture 10 comprises a multi-layer thermoplastic material sheet S having first and second discrete outer layers 1, 1' sandwiching a plurality of discrete inner foamed layers I. In this embodiment, the first and second discrete outer layers 1, 1' are substantially identical with each other. The first and second discrete outer layers 1, 1' and the plurality of discrete inner foamed layers I are also integral with one another, meaning that they are not laminated together. As further shown, the outer layers 1, 1' are each unfoamed skin layers having smooth outer surfaces, and each of the plurality of discrete inner foamed layers I are microcellular.

The plurality of discrete inner foamed layers I in this embodiment include two substantially identical second inner foamed layers 2, 2' positioned immediately adjacent to the first and second discrete outer layers 1, 1', respectively. The second inner foamed layers 2, 2' each include a first plurality of closed cells as shown, wherein the first plurality of closed cells has an average cell diameter ranging from about 5 to about 10 microns. The plurality of discrete inner foamed layers I further include a third inner foamed layer 3 positioned immediately adjacent to and interposed between the second inner foamed layers 2, 2'. The third inner foamed layer 3 includes a second plurality of closed cells as shown, wherein the second plurality of closed cells has an average cell diameter ranging from about 30 to about 50 microns. Finally, the outer layers 1, 1' and the plurality of discrete inner foamed layers I are generally symmetrically disposed about a central axis C. (Note: Because the partial cross-sectional view of FIG. 1 was obtained by "scoring" a circular coupon along its diameter and then breaking along the indented score line, an artifact A is present. Artifact A is not a separate layer; rather, it is the result of having a non-planar portion of the cross-sectional view corresponding to the depth of the score line.)

Figure 2:
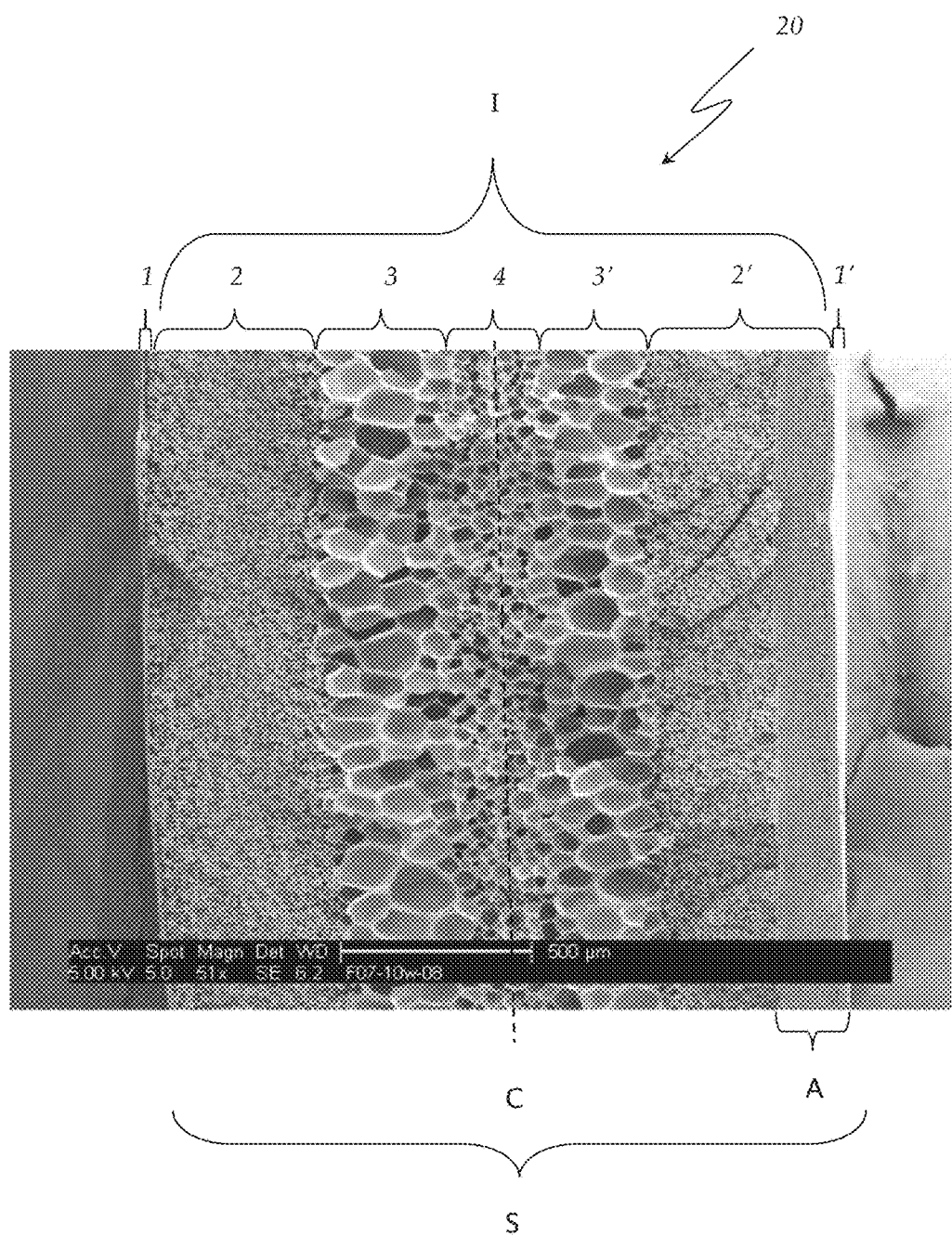
FIG. 2 is a scanning electron micrograph showing a partial cross-sectional view of a square coupon of RPET (23 cm×23 cm×0.107 cm) (taken from the base portion of a thermoformed cup) having an average relative density of about 14% and exhibiting a multi-layer foamed structure in accordance with an embodiment of the present invention.

With reference to FIG. 2, the invention in another embodiment is directed to a multi-layer foamed polymeric article of manufacture 20 made from a solid monolithic sheet of a semi-crystalline polymer; namely, PET. As shown, the multi-layer foamed polymeric article of manufacture 20 comprises a multi-layer thermoplastic material sheet S having first and second discrete outer layers 1, 1' sandwiching a plurality of discrete inner foamed layers I. In this embodiment, the first and second discrete outer layers 1, 1' are substantially identical with each other. The first and second discrete outer layers 1, 1' and the plurality of discrete inner foamed layers I are also integral with one another, meaning that they are not laminated together. As further shown, the outer layers 1, 1' are each unfoamed skin layers having smooth outer surfaces, and each of the plurality of discrete inner foamed layers I are microcellular.

The plurality of discrete inner foamed layers I in this embodiment include two substantially identical second inner foamed layers 2, 2' positioned immediately adjacent to the first and second discrete outer layers 1, 1', respectively, as well as two substantially identical third inner foamed layers 3, 3' positioned immediately adjacent to the second inner foamed layers 2, 2', respectively. The second inner foamed layers 2, 2' each include a first plurality of closed cells as shown, wherein the first plurality of closed cells has an average cell diameter ranging from about 5 to about 10 microns. Similarly, the third inner foamed layers 3, 3' each include a second plurality of closed cells as shown, wherein the second plurality of closed cells has an average cell diameter ranging from about 30 to about 50 microns. The plurality of discrete inner foamed layers I further include a fourth inner foamed layer 4 positioned immediately adjacent to and interposed between the third inner foamed layers 3, 3'. The fourth inner foamed layer 4 includes a third plurality of closed cells as shown, wherein the third plurality of closed cells has an average cell diameter ranging from about 20 to about 40 microns. Finally, the outer layers 1, 1' and the plurality of discrete inner foamed layers I are generally symmetrically disposed about a central axis C. (Note: Because the partial cross-sectional view of FIG. 2 was obtained by "scoring" a square coupon along its mid-section and then breaking along the indented score line, an artifact A is present. Artifact A is not a separate layer; rather, it is the result of having a non-planar portion of the cross-sectional view corresponding to the depth of the score line.)

Figure 3:
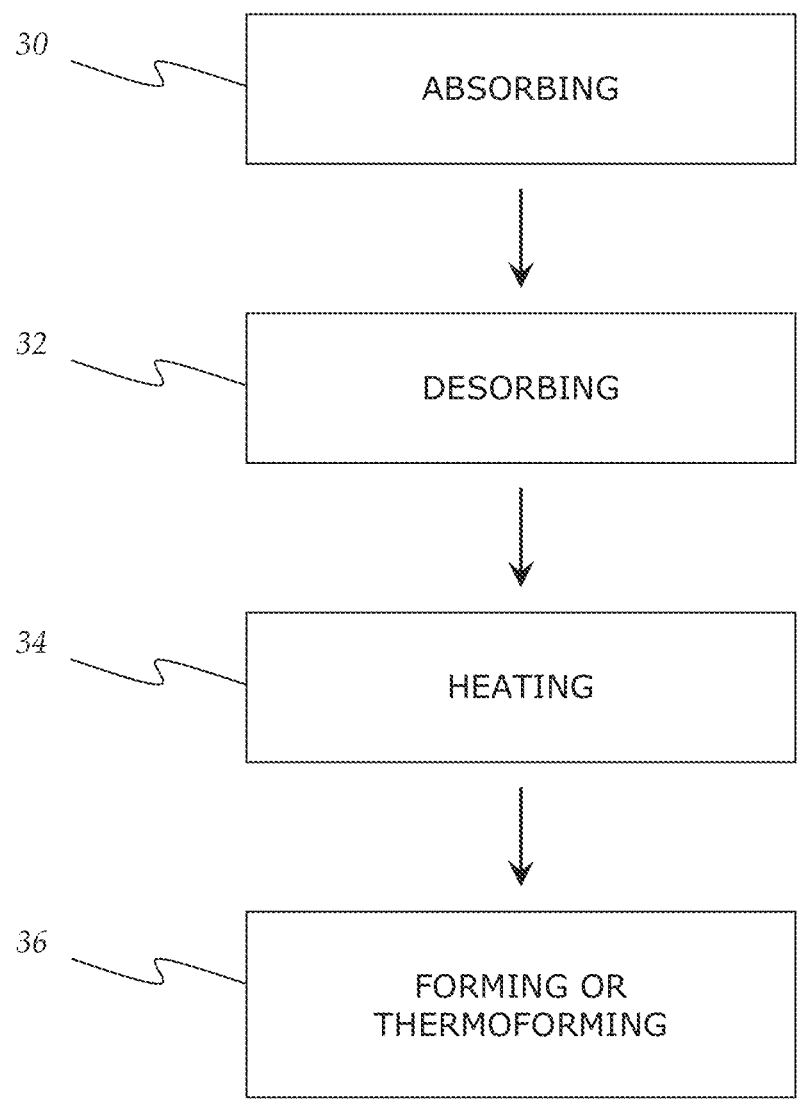
FIG. 3 is a block diagram of a method for making a multi-layer foamed polymeric object from a solid monolithic thermoplastic material sheet in accordance with an embodiment of the present invention.

In another embodiment, the invention is also directed to a method for making a multi-layer foamed polymeric object as described above from a solid monolithic thermoplastic material sheet. Because the thermoplastic material sheet is preferably a semi-crystalline polymer, it has a first bulk crystallinity level that generally ranges from about 1 to about 9 percent. The method of this embodiment entails increasing the bulk crystallinity level of the thermoplastic material sheet in a serial or step-wise manner, thereby allowing for the transformation of the solid sheet into the multi-layer foamed polymeric object. More specifically, and with reference to FIG. 3, the method of this embodiment comprises an initial absorbing step 30 whereby an effective amount of a plasticizing gas (such as, for example, $CO_2$ or $N_2$) is absorbed into the thermoplastic material sheet. The absorbing step 30 is generally accomplished by placing the thermoplastic material sheet into a pressure vessel, and then pressurizing the vessel to a first selected pressure, temperature, and for period of time sufficient to (1) yield a reversibly plasticized thermoplastic material sheet, and (2) induce a crystallinity change across at least the outer portions of the thermoplastic material sheet. The first selected pressure generally ranges from about 0.345 MPa to about 9.65 MPa (or more preferably about 5.2 MPa to about 7.1 MPa), and the first selected temperature generally ranges from about −20° F. to about 150° F. Depending on the selected pressure and temperature, the selected period of time generally ranges from about a few hours to well over a hundred hours.

As a result of the absorbing step 30, the plasticized thermoplastic material sheet becomes impregnated with the plasticizing gas in an amount that is generally greater than about 0.5 percent by weight, and attains a second bulk crystallinity level that is greater than the first bulk crystallinity level. In other words, the absorbing step 30 increases the bulk crystallinity of the thermoplastic material sheet because in this step the minimum gas concentration needed to induce crystallization of the thermoplastic material sheet is met or exceeded. This increase in crystallinity is generally not uniform across the thickness of the sheet because the threshold gas concentration (i.e., minimum gas concentration needed to induce a crystallinity change) across the sheet is preferably not achieved (meaning an equilibrium condition is not reached); rather, the crystallinity tends to be greatest at or near the surfaces (where the gas concentration reaches and/or exceeds the threshold gas concentration) and lowest in the middle (where the gas concentration is below the threshold gas concentration).

After the absorbing step 30 and as further shown, the method further comprises a desorbing step 32, whereby a portion of the plasticizing gas impregnated within the thermoplastic sheet is allowed to diffuse out of the plasticized thermoplastic material sheet and into the atmosphere. Accordingly, the desorbing step 32 generally occurs by exposing the plasticized thermoplastic material sheet to a reduced pressure such as, for example, atmospheric pressure or lower. In order to further process the plasticized thermoplastic material sheet, it has been found that the plasticizing gas concentration within the thermoplastic material sheet should preferably be maintained at a level of greater than about 0.01 percent by weight. In addition, the desorbing step 32 generally occurs at a second selected temperature ranging from about −40° F. to about 150° F.

After the desorbing step 32 and as further shown, the method further comprises a heating step 34, whereby the plasticized thermoplastic material sheet is heated in order to initiate foaming (i.e., bubble formation). In this step, the plasticizing gas impregnated within the thermoplastic sheet coalesces into a plurality of closed cells (i.e., bubbles). The heat source may be either a heated silicon oil bath or an infrared heater, for example. The heating step 34 yields a foamed thermoplastic material sheet having a third bulk crystallinity level that is greater than or equal to the second bulk crystallinity level (attained as a result of the absorbing step 30). The heating step 34 also yields a foamed thermoplastic material sheet characterized by a novel multi-layer structure (see, e.g., FIG. 1) in which first and second discrete outer layers sandwich a plurality of discrete inner foamed layers. The foamed thermoplastic material sheet may be fully foamed, or it may only be partially foamed, after the heating step 34.

Finally, and after or concurrent with the heating step 34, the method further comprises a thermoforming step 36 in which the foamed thermoplastic sheet is either cold formed or thermoformed in a thermoformer to yield the multi-layer foamed polymeric object. The forming/thermoforming step 36 involves the mechanical deformation of the partially or fully foamed thermoplastic material sheet into a desired shape such as, for example, the shape of a cup or tray. As a result of the forming/thermoforming step 36, the foamed thermoplastic material sheet attains a fourth bulk crystallinity level that is greater than or equal to the third bulk crystallinity level (attained as a result of the heating step 34).

Figure 4:
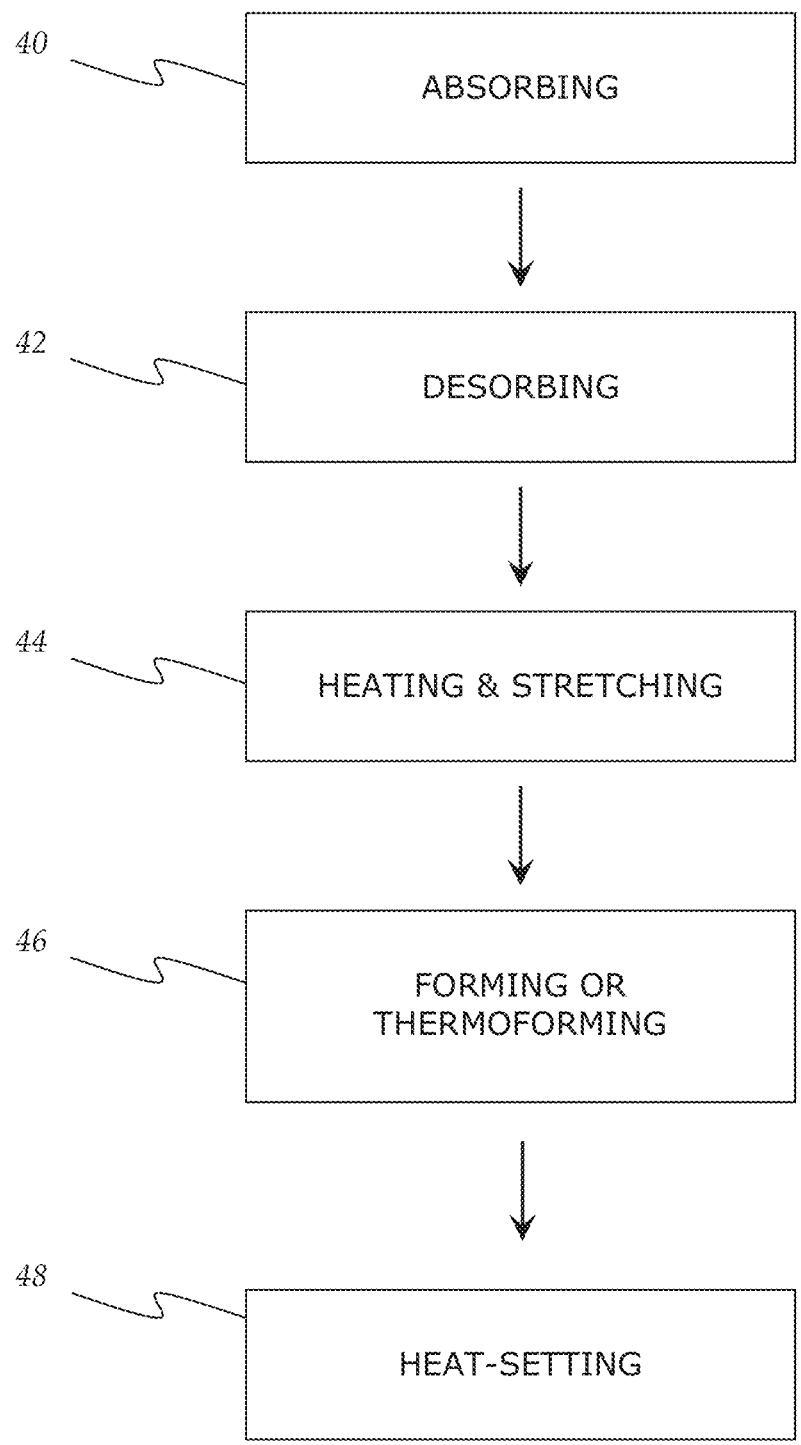
FIG. 4 is a block diagram of a method for making a shaped multi-layer foamed polymeric object from a solid monolithic thermoplastic material sheet in accordance with an embodiment of the present invention.

In yet another embodiment and with reference to FIG. 4, the present invention is directed to a method for making a shaped multi-layer foamed polymeric article of manufacture (such as, for example, a cup or tray) from a solid monolithic thermoplastic material sheet, wherein the thermoplastic material sheet has a first bulk crystallinity level. In this embodiment, the method comprises at least the following steps: (1) absorbing 40 a plasticizing gas into the thermoplastic material sheet, the step of absorbing 40 occurring at a first selected pressure, temperature, and period of time sufficient to yield a reversibly plasticized thermoplastic material sheet, the plasticized thermoplastic material sheet being impregnated with the plasticizing gas and having a second bulk crystallinity level that is greater than the first bulk crystallinity level; (2) desorbing 42 at least some of the plasticizing gas from the plasticized thermoplastic material sheet; (3) heating and mechanically stretching 44 the plasticized thermoplastic material sheet to thereby initiate foaming, the step of heating and mechanically stretching 44 occurring by transferring a selected amount of heat energy from a heat source sufficient to yield a foamed thermoplastic material sheet, the foamed thermoplastic material sheet having a third bulk crystallinity level that is greater than the first and second bulk crystallinity levels; and (4) thermoforming 46 the foamed thermoplastic material sheet in a thermoformer to yield the shaped multi-layer foamed polymeric article of manufacture (see, e.g., FIG. 2), the multi-layer foamed polymeric article of manufacture having a fourth bulk crystallinity level that is greater than or equal to the first, second, and third bulk crystallinity levels. The method may further comprise the step of heat-setting 48 the shaped multi-layer foamed polymeric article of manufacture, while in the thermoformer, to thereby further increase the bulk crystallinity of the shaped multi-layer foamed polymeric article of manufacture to a fifth bulk crystallinity level, wherein the fifth bulk crystallinity level is greater than the first, second, third, and fourth bulk crystallinity levels. In an alternative embodiment, the step of thermoforming may be replaced with a step of forming (such as, for example, roll-forming or mechanically bending without added heat as appreciated by those skilled in the art).

Figure 5A:
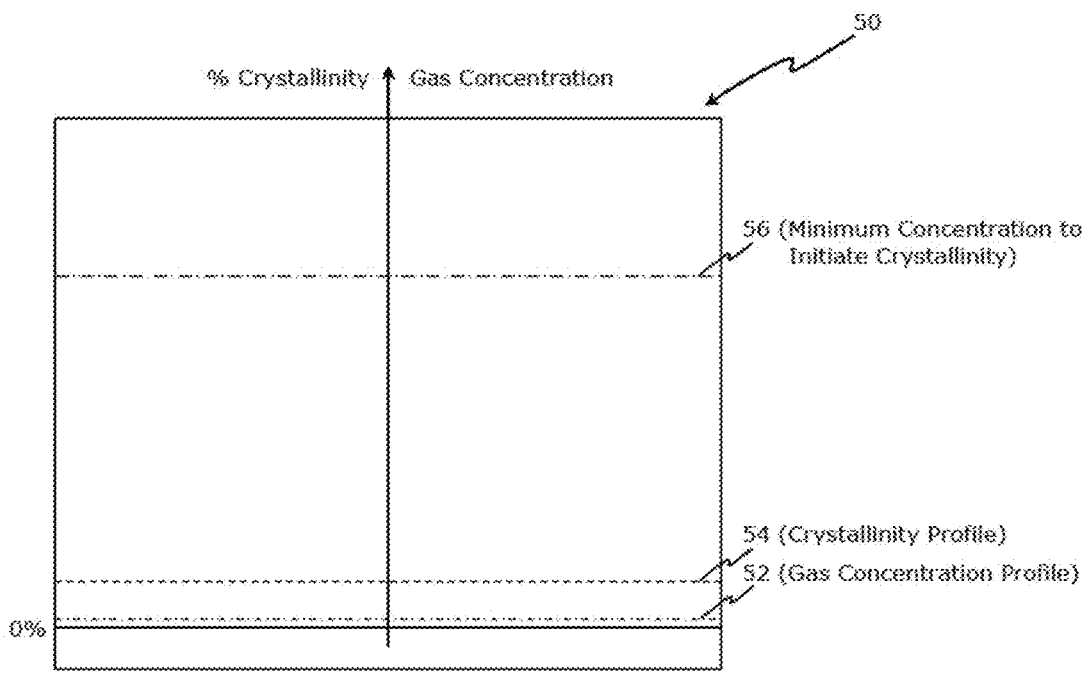
FIG. 5A represents a partial cross-sectional view of a thermoplastic material sheet before processing, and shows an initial and near zero uniform plasticizing gas concentration profile, an initial and uniform bulk crystallinity profile, and a threshold gas concentration profile which must be met or exceeded in order to induce a crystallinity change in the thermoplastic material sheet.
Figure 5B:
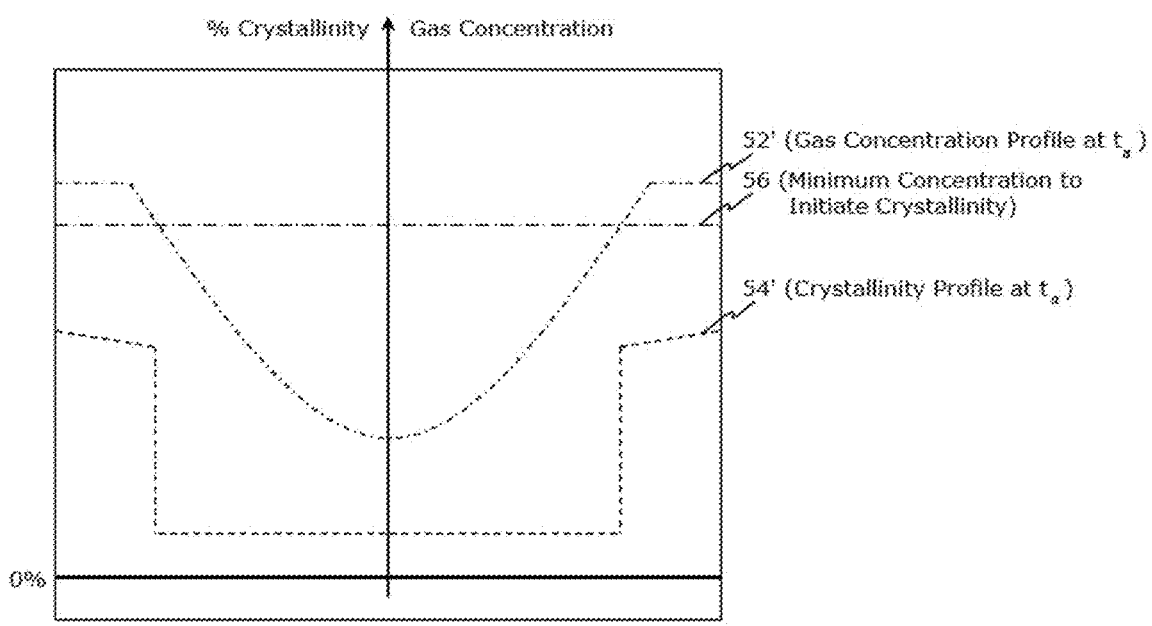
FIG. 5B represents a partial cross-sectional view of thermoplastic material sheet of FIG. 5A after the step of absorbing, and shows a second plasticizing gas concentration profile that is substantially greater than the initial and near zero uniform plasticizing gas concentration profile, and a second crystallinity level achieved at the outer portions of the thermoplastic material sheet.
Figure 5C:
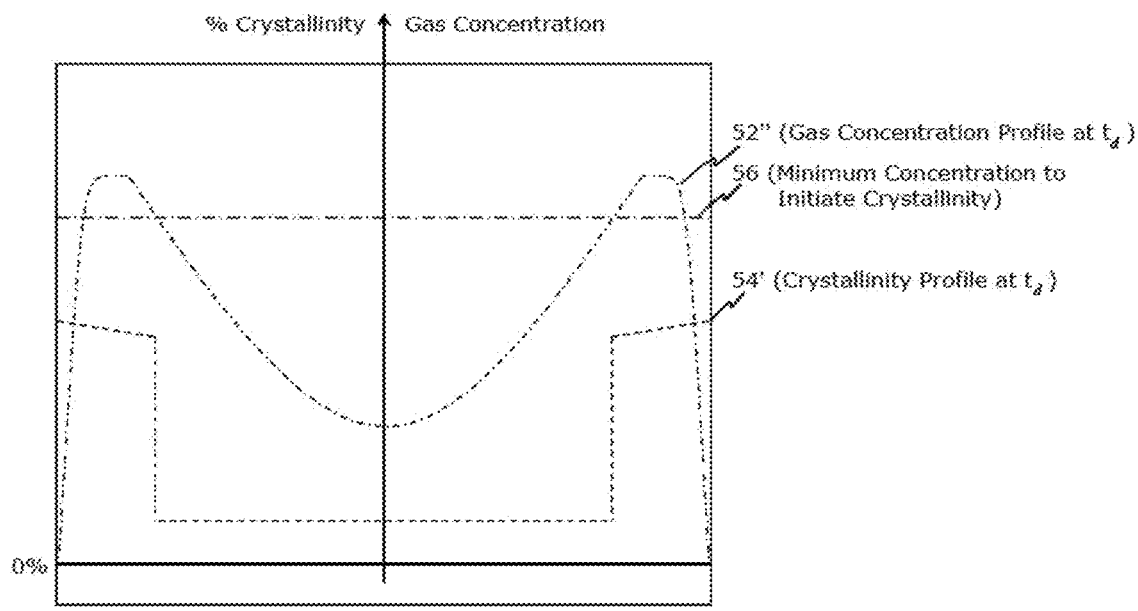
FIG. 5C represents a partial cross-sectional view of the thermoplastic material sheet of FIG. 5B after the step of desorbing, and shows a third plasticizing gas concentration profile wherein plasticizing gas has desorbed from the outer portions of the thermoplastic material sheet.
Figure 5D:
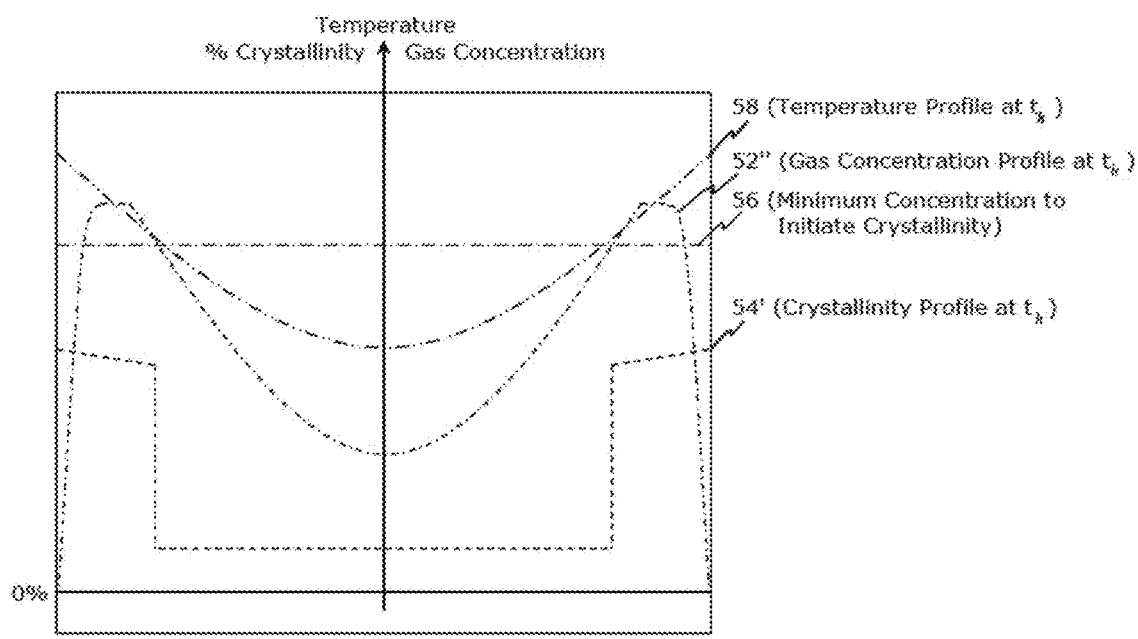
FIG. 5D represents a partial cross-sectional view of the thermoplastic material sheet of FIG. 5C after the step of heating, and shows a non-uniform temperature profile across the thermoplastic material sheet.
Figure 5E:
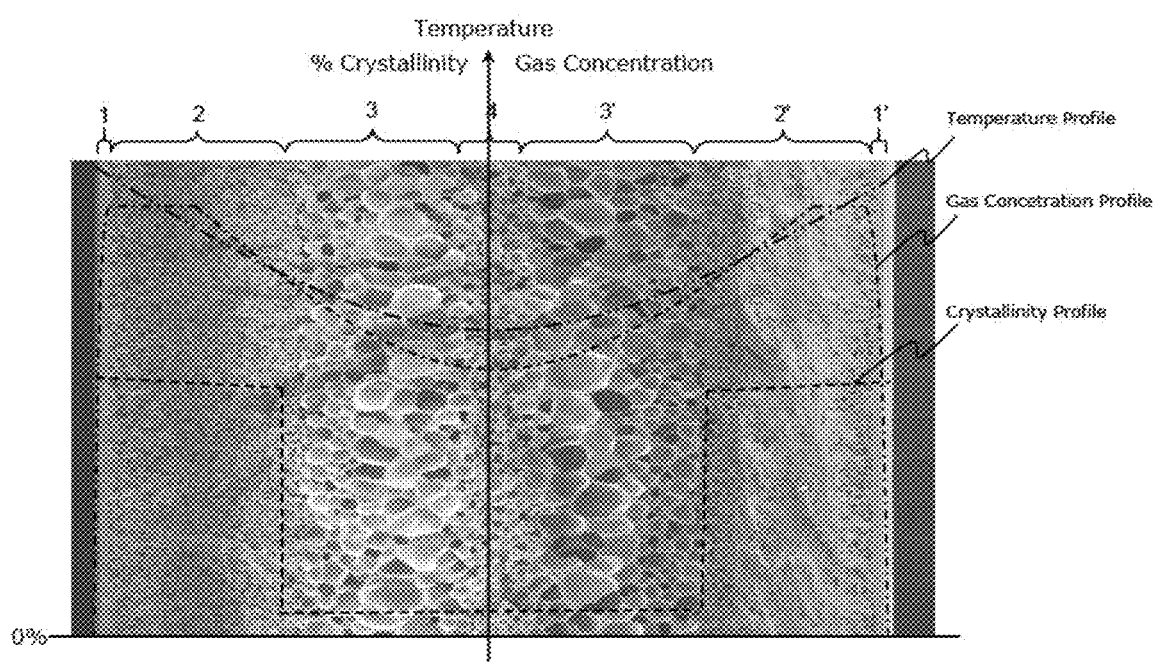
FIG. 5E is a scanning electron micrograph showing a partial cross-sectional view of a thermoformed rectangular coupon of RPET (10 cm×15 cm×0.107 cm) exhibiting a multi-layer foamed structure in accordance with an embodiment of the present invention, and wherein a plasticizing gas concentration profile, a crystallinity profile, and a temperature profile have been superimposed thereon as a way to rationalize the formation of the novel structure.
Figure 6:
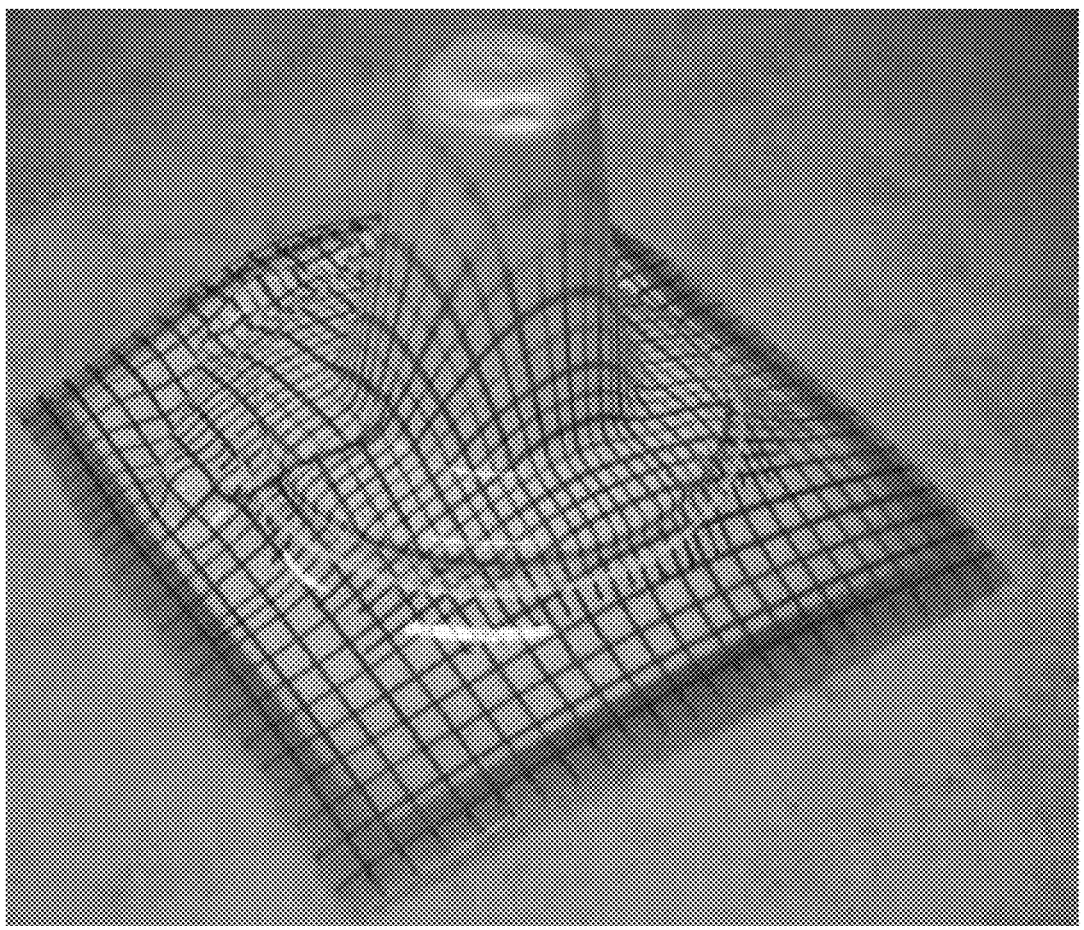
FIG. 6 is a photograph of a shaped thermoformed polymer cup made from a square section of polymer that had been marked, prior to processing, with gridlines, and wherein the lines on the final thermoformed polymer cup show the areas in which stretching occurred during the process.
Figure 7:
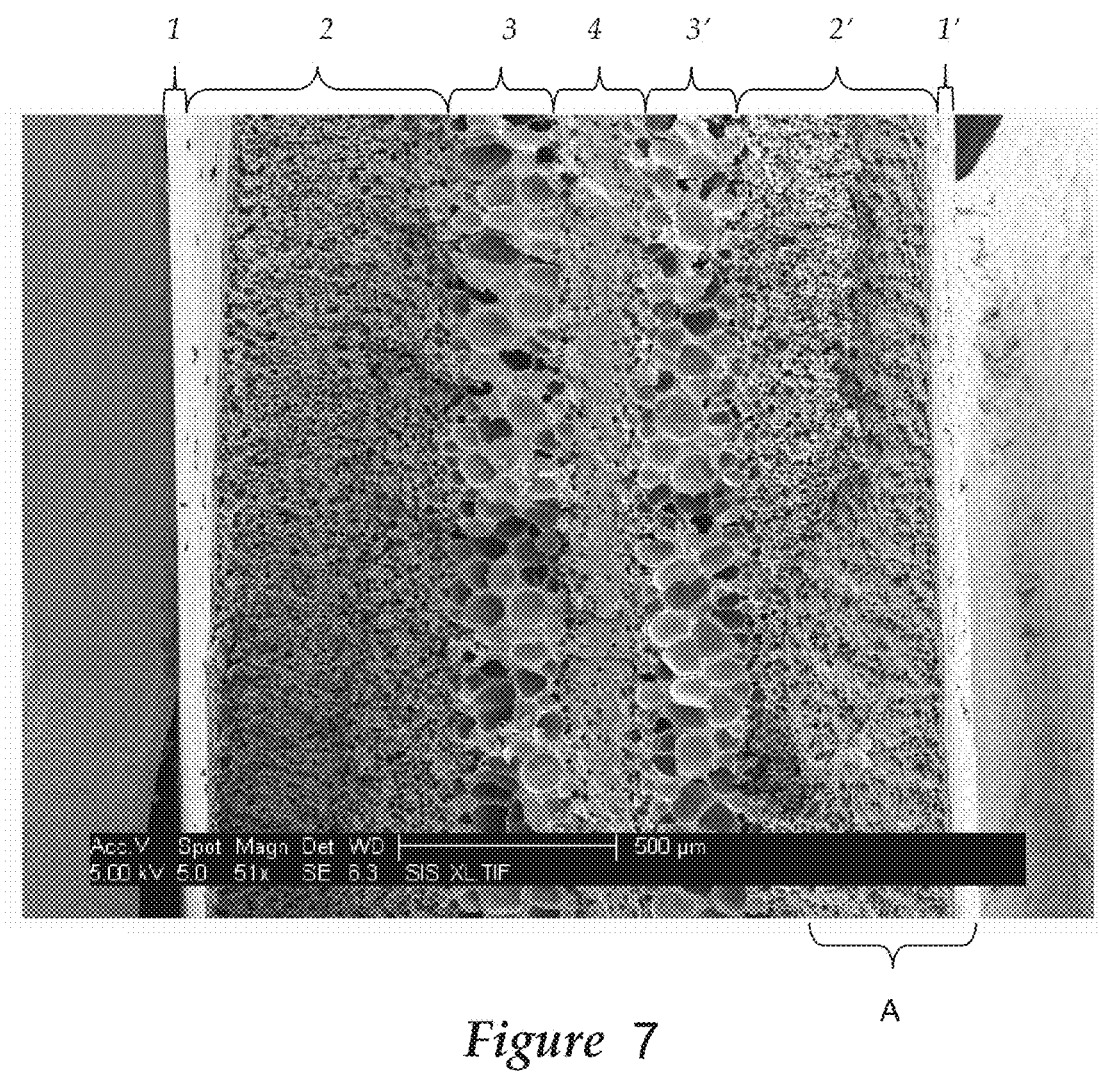
FIG. 7 is a scanning electron micrograph showing a partial cross-sectional view of a thermoformed circular coupon of RPET (3.8 cm diameter×0.107 cm) exhibiting a multi-layer foamed structure in accordance with an embodiment of the present invention.

Without necessarily prescribing to any scientific theory, it is believed that the discrete layer formation associated with each of the above described embodiments is the result of a combination of (1) a crystallinity gradient, (2) a plasticizing gas concentration gradient, and (3) a temperature gradient, all three of which are formed across the thickness of the thermoplastic material sheet during processing. Thus, and with reference to FIGS. 5A-E (which figures depict hypothetical crystallinity, gas concentration, and temperature profiles across a thermoplastic material sheet), discrete layer formation may be rationalized in the following way. First, and as shown in FIG. 5A, a thermoplastic material sheet 50 is provided that has an initial and near zero uniform plasticizing gas concentration profile 52, and an initial and uniform bulk crystallinity profile 54 (e.g., 9% crystallinity change in the thermoplastic material sheet 50). Second, and as shown in FIG. 5B, the thermoplastic material sheet 50 is exposed under pressure to the plasticizing gas for a period of time t0 (i.e., step of absorbing) to thereby form a second plasticizing gas concentration profile 52' that is substantially greater than the initial and near zero uniform plasticizing gas concentration profile 52 (with a minimum gas concentration occurring at the center axis). As a result, and because the second plasticizing gas concentration profile 52' reaches a level that is above the threshold gas concentration profile 56 at the outer portions of the thermoplastic material sheet 50, the initial crystallinity level 54 sharply increases to a second crystallinity level 54' at the outer portions of the thermoplastic material sheet 50. Third, and as shown in FIG. 5C, the thermoplastic material sheet 50 is returned to ambient conditions for a period of time U thereby allowing some of the plasticizing gas to desorb (i.e., step of desorbing) from the outer portions of the thermoplastic material sheet 50 and form a third plasticizing gas concentration profile 52". Fourth, the thermoplastic material sheet 50 is heated for a period of time U to thereby initiate foaming and form a non-uniform temperature profile 58 across the thermoplastic material sheet 50 (with a minimum temperature at the center axis). Finally, the thermoplastic material sheet 50 is thermoformed thereby further increasing the bulk crystallinity level (not shown). It is believed that discrete layer formation of the thermoplastic material sheet 50 (see, e.g., FIG. 5E) is the result of the interplay between these crystallinity gas concentration and, temperature profiles.

In another aspect, the present invention is also directed to a multi-layered foamed plastic structure having graded (i.e., a gradient of) physical properties (such as, for example, strength and stiffness) across its cross-section. In this regard, it has been discovered that a multi-layered foamed plastic structure may be created that optimizes the structure's stiffness, buckling resistance, and strength for a given amount of plastic. The multiple layers of such a multi-layered structure may include: (1) skins of solid material at each surface; (2) high density closed cell layers immediately adjacent to each skin layer; and (3) lower or constant density foam layers (either closed or open cells, and either with varying or constant average cell size) progressing towards the center of the multi-layer structure. The density at the inner core generally needs to be no greater than what is needed to handle the maximum shear stress induced at the neutral axis (of the cross section under a flexural load). By creating cellular layers having the greatest density foam adjacent to the surface skin layers, the moment of inertia of the cross section may be increased over the foam (with a uniform foam core of the same average density). This increased moment results in greater bending strength, greater flexural stiffness, and increased resistance to buckling for a given average density. In addition, the effective material stiffness (flexural modulus) increases with increasing density.

The Flexural Stiffness, defined as the product of the flexural modulus (E) and moment of inertia (I), allows comparison of different materials and geometries with respect to their resistance to bending. By superposition, the flexural stiffness of layered foams is $$\sum_{1}^{n} (E_n \cdot I_n).$$

Since $I_n$ increases the farther the layer is located from the cross-section's centroid, the greatest value for $$\sum_{1}^{n} (E_n \cdot I_n)$$

occurs when $E_n$ is largest for the same layer for which $I_n$ is largest (e.g., the outermost layer). The second largest $E_n$ will be paired with the next inner layer, and so on. This foam layer pattern generally allows for the greatest material efficiency under flexural loads.

A similar relationship between buckling loads may also be expressed (buckling failure also depends both on E and on the structure's geometry). The buckling load, defined as $P_{cr}=\Pi^3 \ E \ I/L^2$, increases with E and I. This minimum buckling load may be determined by the structure's ability to resist bending caused by any slight misalignment of the structure's central axis with an applied load. By superposition, the same argument may be made in that $P_{cr}$ varies as $$\sum_{1}^{n} (E_n \cdot I_n).$$

Thus, for maximum material efficiency with buckling loads, the foam density of each layer should follow the same pattern as described previously for flexural loads.

Another point with regards to increasing stiffness over conventional foams is that closed cells generally do not lose their flexural modulus as quickly as open cell foams as the foam density is reduced. This is due to the trapped gas inside the cells. Thus, the stiffness generally does not reduce as quickly with density reduction as common open cell foams. Also, in foams with thin skins that are subjected to flexural or buckling loads, for maximum effectiveness, the foam underneath the skin should preferably be of sufficient strength to keep the skin aligned, and not allow the skin to separate from the core or to buckle inwardly so as to compress the foam core. The minimum layer density to meet such strength requirements may also vary with the skin thickness.

Another advantage may be found for ordinary sandwiched foams in which the outermost layer(s) may be of any material (e.g., sheet metal or solid higher modulus polymer), and which are either bonded, fused, or mechanically fastened to an ordinary polymeric foam sheet of a single density. In this case, the bond strength between the foam and the outermost layer may often the limiting factor. Material use efficiency dictates the use of lower density foam, yet higher density or even foams with solid skins are required for higher bond strengths. Thus, the advantage of using multiple layered foams with a cellular core between two skins is that the density and strength can be high at the mating line, while being progressively reduced towards the center line.

By using the monolithic foams having a solid integral skin as the core of a sandwich construction, the following advantages may result: (1) greatly increased flat surface area available for use of a thin adhesive coating (many adhesives are stronger when applied in thin layers); (2) if the outer layer of the foam core is not solid, but instead a closed small cell (less than 100 microns), substantial savings may still result compared to conventional sized cells due to reduced adhesive use (the alternative, using more adhesive to fill open cells on the surface or larger surface irregularities due to larger cells, requires more adhesive which adds weight and cost); (3) greatly increased surface area for fusion bonding of a polymeric solid skin to the foam when the outer layer of the foam core is unfoamed solid polymer (bonds may be solvent based or fused by friction induced heat or other means—in fact, many fusion bonds are impractical with low density foams); and (4) for mechanically bonded solid skins such as stitched bonds, clearly having a high density or even an integral skin to fasten to while having lower density monolithic inner layers creates higher bond strength with lower total material weight (the shear strength of each fastening element is generally many times higher in a solid than for a medium-density foam). In the case of thermoformed foamed objects, the art of twin sheet or triple sheet thermoforming is understood. Typically, the top and bottom skins are partially fused to the foam core due to the heat and pressure of thermoforming.

The advantages of graded foam structures may be realized for solid-state foamed polymeric objects made from raw materials in the form of rolls, sheets, thermoformed solid articles (e.g. speaker cones), as well as compression molded solid shapes. The foaming process on solid-state saturated polymeric objects may be conducted in a variety of ways, including foaming in heated liquid bath, foaming in hot air oven, foaming in infrared oven, foaming in a compression molding setup or foaming in thermoforming molds. To gain the advantages noted above, the thickness of the polymeric object being processed is preferably substantially smaller than the other dimensions. In the case of a rod shape object, the diameter is preferably substantially smaller than the length of the polymeric object being processed.

For purposes of illustration and not limitation, the following examples more specifically discloses exemplary manufacturing steps and actual experimental results associated with the manufacture of multi-layered foamed polymeric objects and articles of manufacture in accordance with the present invention.

Example 1

A 3.8 cm diameter circular section of polymer was punched from 0.107 cm thick sheet of recycled PET (RPET) acquired from LaVergne (The LaVergne Group, Canada). The polymer was then wrapped in a paper towel and placed in a pressure vessel (~21° C.) at 5.0 MPa for 72 hours for the purpose of carbon dioxide absorption. After absorption, the polymer was transferred to a freezer (~0° C.) for 24 hours to allow carbon dioxide desorption. The polymer was then removed and placed at room temperature (~20° C.) for one hour for further desorption. The polymer was then heated (~100° C.) in a silicon bath for 30 seconds to initiate foaming. FIG. 1 is a scanning electron micrograph showing a partial cross-sectional view from the center of the thermoformed circular polymer section manufactured using the above procedure.

Example 2

Figure 8:
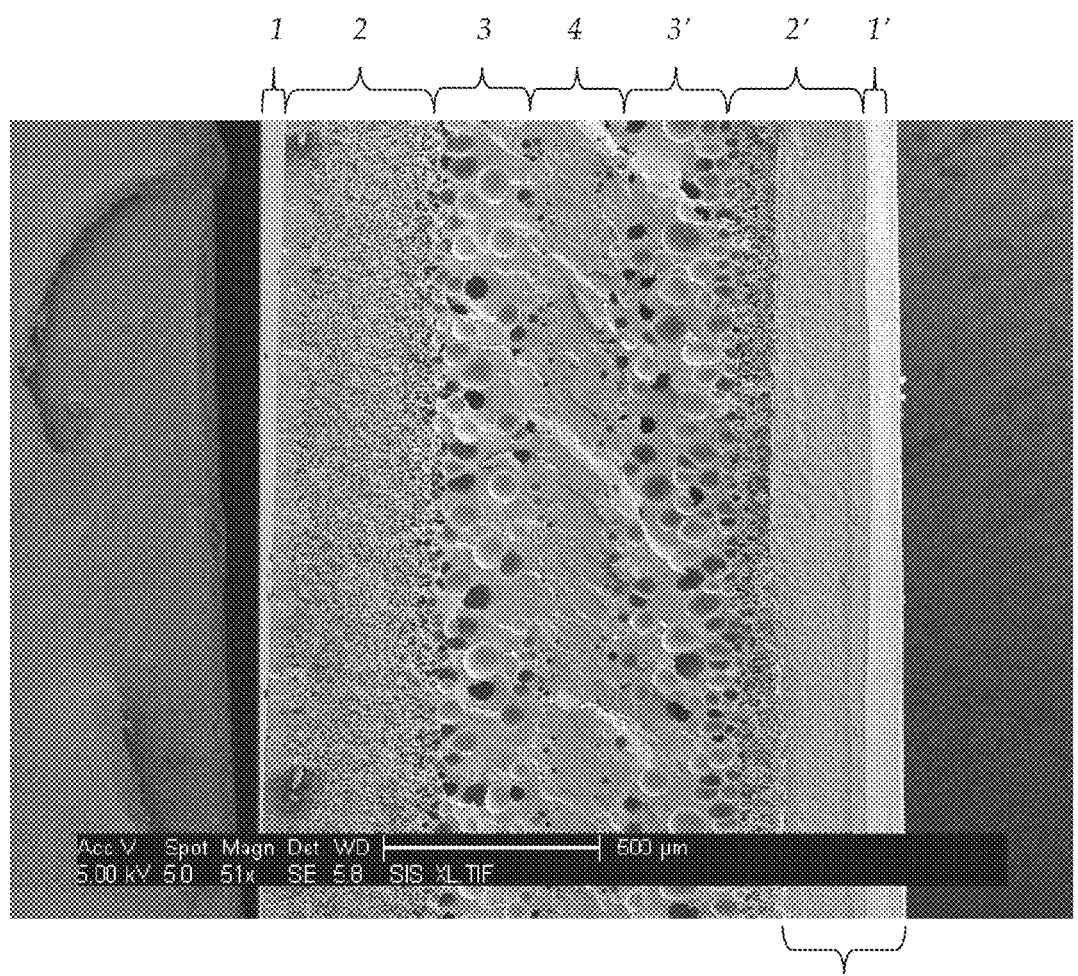
FIG. 8 is scanning electron micrograph showing a partial cross-sectional view of a thermoformed rectangular coupon of RPET (10 cm×15 cm×0.107 cm) exhibiting a multi-layer foamed structure in accordance with an embodiment of the present invention.

A 3.8 cm diameter circular section of polymer was punched from 0.107 cm thick sheet of recycled PET (RPET) acquired from LaVergne (The LaVergne Group, Canada). The polymer was then wrapped in a paper towel and placed in a pressure vessel (~21° C.) at 5.0 MPa for 36 hours for the purpose of carbon dioxide absorption. After absorption, the polymer was transferred to a freezer (~0° C.) for 24 hours to allow carbon dioxide desorption. The polymer was then removed and placed at room temperature (~20° C.) for one hour for further desorption. The polymer was then heated (~100° C.) in a silicon bath for 30 seconds to initiate foaming. FIG. 8 is a scanning electron micrograph showing a partial cross-sectional view from the center of the thermoformed circular polymer section manufactured using the above procedure.

Example 3

Figure 9:
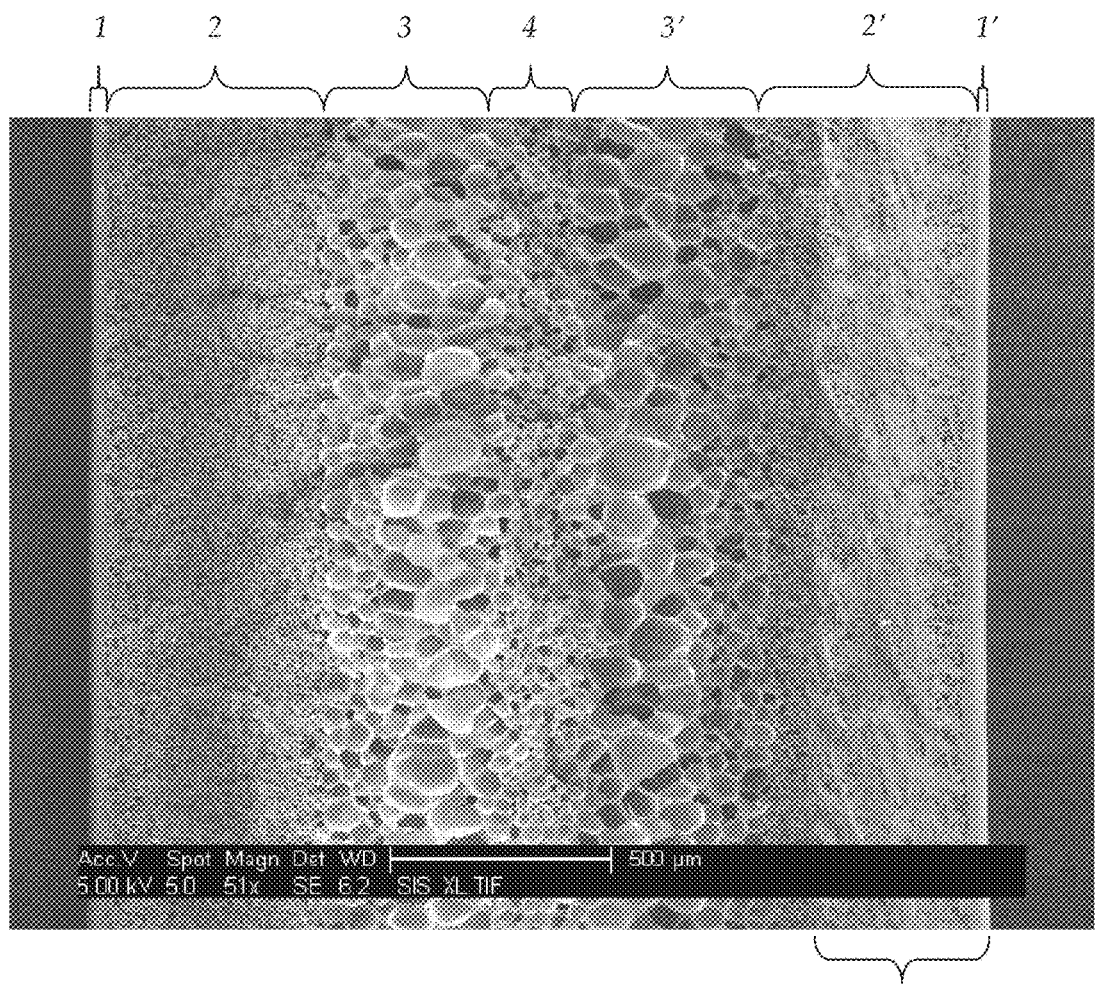
FIG. 9 is scanning electron micrograph showing a partial cross-sectional view of a thermoformed rectangular coupon of RPET (10 cm×15 cm×0.107 cm) exhibiting a multi-layer foamed structure in accordance with an embodiment of the present invention.

A 10 cm×15 cm rectangular section of polymer was cut from 0.107 cm thick sheet of recycled PET (RPET) acquired from LaVergne (The LaVergne Group, Canada). The polymer was then wrapped in a paper towel and placed in a pressure vessel (~21° C.) at 5.0 MPa for 49 hours for the purpose of carbon dioxide absorption. After absorption, the polymer was transferred to a freezer (~0° C.) for 24 hours to allow carbon dioxide desorption. The polymer was then removed and placed at room temperature (~20° C.) for one hour for further desorption. The polymer was then loaded into a thermoformer clamping frame, wherein the polymer was heated (~110° C.) using infrared heat for 8 seconds and simultaneously stretched to initiate foaming. FIG. 9 is a scanning electron micrograph showing a partial cross-sectional view from the center portion of a thermoformed rectangular polymer section manufactured using the above procedure.

Example 4

Figure 10:
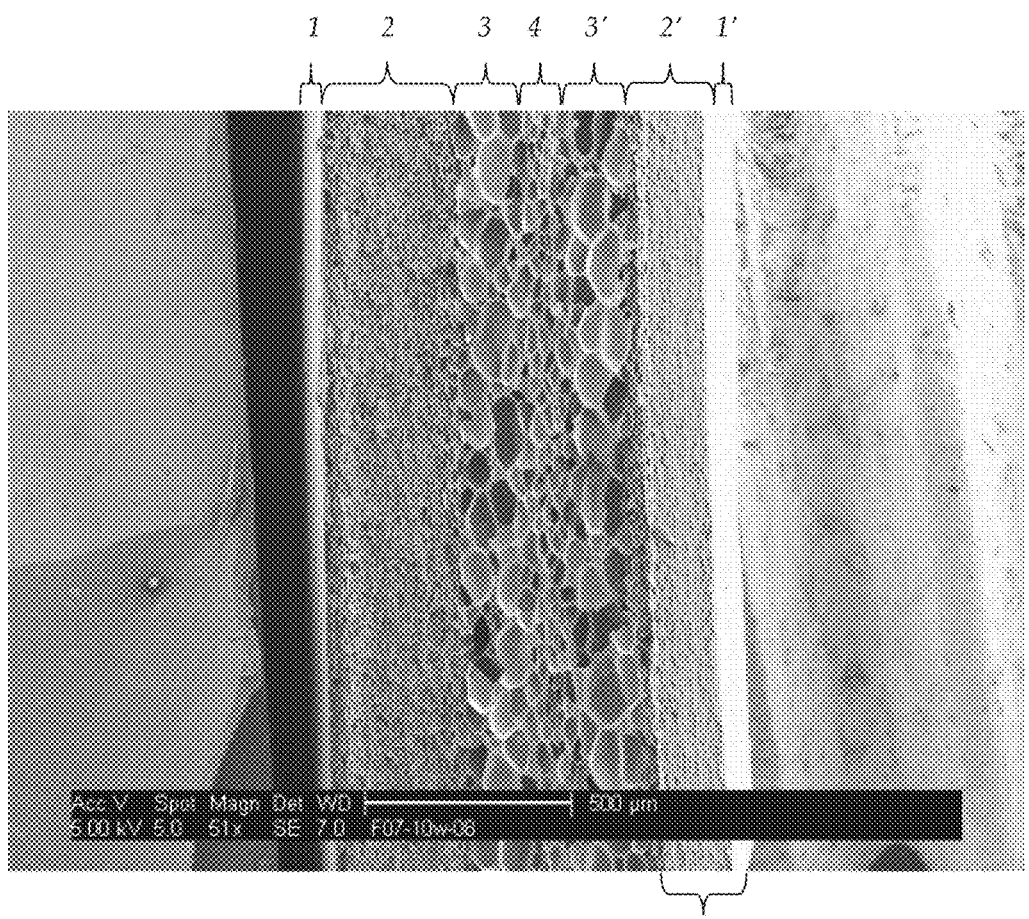
FIG. 10 is scanning electron micrograph showing a partial cross-sectional view of a square of RPET (23 cm×23 cm×0.107 cm) (taken from the middle wall section of a thermoformed cup) having an average relative density of about 14% exhibiting a multi-layer foamed structure in accordance with an embodiment of the present invention.

A 10 cm×15 cm rectangular section of polymer was cut from 0.107 cm thick sheet of recycled PET (RPET) acquired from LaVergne (The LaVergne Group, Canada). The polymer was then wrapped in a paper towel and placed in a pressure vessel (~21° C.) at 5.0 MPa for 49 hours for the purpose of carbon dioxide absorption. After absorption, the polymer was transferred to a freezer (~0° C.) for 24 hours to allow carbon dioxide desorption. The polymer was then removed and placed at room temperature (~20° C.) for one hour for further desorption. The polymer was then loaded into a thermoformer clamping frame, wherein the polymer was heated (~110° C.) using infrared heat for 16 seconds and simultaneously stretched to initiate foaming. FIG. 10 is a scanning electron micrograph showing a partial cross-sectional view from the center portion of a thermoformed rectangular polymer section manufactured using the above procedure.

Example 5

Figure 11:
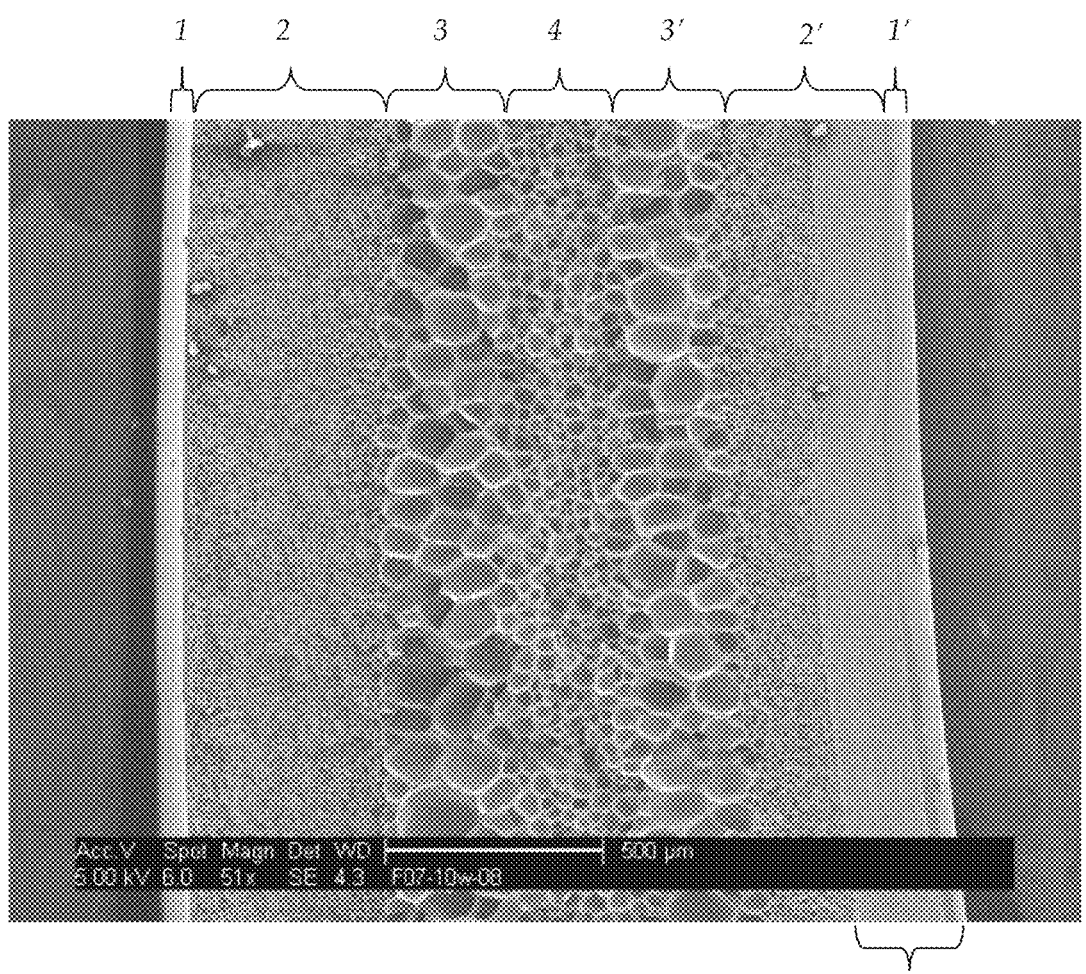
FIG. 11 is scanning electron micrograph showing a partial cross-sectional view of a square of RPET (23 cm×23 cm×0.107 cm) (taken from the upper portion of a thermoformed cup) exhibiting a multi-layer foamed structure in accordance with an embodiment of the present invention.

A 23 cm×23 cm square section of polymer was cut from 0.107 cm thick sheet of recycled PET (RPET) acquired from LaVergne (The LaVergne Group, Canada) (P3000 RPET 0.042" roll stock). The polymer was then wrapped in a paper towel and placed in a pressure vessel (~21° C.) at 5.0 MPa for 49 hours for the purpose of carbon dioxide absorption. After absorption, the polymer was transferred to a freezer (~0° C.) for 24 hours to allow carbon dioxide desorption. The polymer was then removed and placed at room temperature (~20° C.) for one hour for further desorption. The polymer was then loaded into a thermoformer clamping frame, wherein the polymer was heated (~110° C.) using infrared heat for 12 seconds and simultaneously stretched to initiate foaming. The polymer was then thermoformed into a cup shape using a convex aluminum plug (~32° C.) to assist the drawing of the polymer into the female mold (~155° C.). Air pressure was used to force the polymer into its final cup shape. FIG. 2 is a scanning electron micrograph showing a partial cross-sectional view from the base portion of a thermoformed cup manufactured using the above procedure. FIG. 10 is a scanning electron micrograph showing a partial cross-sectional view from the middle portion of a thermoformed cup manufactured using the above procedure. FIG. 11 is a scanning electron micrograph showing a partial cross-sectional view from the upper portion of a thermoformed cup manufactured using the above procedure.

Example 6

To validate the concepts associated with the graded (i.e., a gradient of) physical properties aspect of the invention, the inventors analyzed sample foams having microstructures similar to those shown in FIGS. 1 and 2. The flexural modulus of each sample was measured using Dynamic Mechanical Analysis (DMA) per ASTM standard D790. The skin thicknesses were measured by conducting scanning electron microscopy and taking the average of 8 to 12 measurements at various locations. The measured flexural modulus was a combined or "apparent" modulus of the cellular core combined with the solid skin. Since the DMA results gave the combined modulus, a Combined Foam Relative Stiffness was calculated by using the combined modulus multiplied by the combined moment of inertia of the entire section (as if the skin and core were homogenous). The Calculated Relative stiffness assumed that the foamed core was homogeneous (even though it was not), and the modulus was calculated per Ashby and Gibson's formula for closed cell foams with Ø=0.6. The stiffness of the skin layers were calculated as the measured modulus of the base polymer multiplied by the geometric moment of inertia of the skin layer. The hypothetical core's stiffness was added to the skin's calculated stiffness to obtain a combined stiffness. The actual measured foam relative stiffness was larger than calculated with the above assumptions in every case. The following table summarizes the test results.

| Starting Solid Thickness inches | Foam Relative Thickness | Skin Thickness | Foam Avg. Rel Density | Actual Measured Foam Sheet Relative Stiffness | Calculated Relative Stiffness Per Ashby & Gibson |
|---|---|---|---|---|---|
| 0.042 - A | 186% | 0.0004 | 19% | 108.9% | 72.5% |
| 0.042 - B | 179% | 0.0006 | 22% | 105.0% | 84.4% |
| 0.042 - C | 188% | 0.0006 | 19% | 115.9% | 87.9% |
| 0.042 - C | 174% | 0.0004 | 23% | 95.5% | 74.2% |
| 0.025 | 208% | 0.0003 | 16% | 106.7% | 88.39% |

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A method for making a multi-layer foamed thermoplastic material sheet from a solid monolithic thermoplastic material sheet, the solid thermoplastic material sheet having a first bulk crystallinity level, the method comprising:
   absorbing an effective amount of gas into the solid thermoplastic material sheet to yield a reversibly plasticized thermoplastic material sheet having:
      a second bulk crystallinity level that is greater than the first bulk crystallinity level; and
      a crystallinity gradient across a thickness of the sheet such that the crystallinity level is lower in the middle of the sheet's thickness than in the sheet's surface,
      wherein the absorbing occurs at a pressure in a range of 0.345 MPa to 9.65 MPa at a temperature in a range of −20° F. to 150° F.;
   desorbing at least some of the gas from the plasticized thermoplastic material sheet at a reduced pressure, as compared to the absorbing pressure, and a temperature in a range of −40° F. to 150° F., wherein the desorbing comprises a first desorbing stage in which the plasticized thermoplastic material sheet is placed in a freezer at a first temperature for a first predetermined time period to allow at least some of the gas to desorb, removing the plasticized thermoplastic material sheet from the freezer after the first predetermined time period, and, subsequent to removing the plasticized thermoplastic material sheet from the freezer, allowing at least some of the gas to desorb at a second temperature, greater than the first temperature, for a second predetermined time period in a second desorbing stage; and
   heating the plasticized thermoplastic material sheet to yield the multi-layer foamed thermoplastic material sheet having:
      a third bulk crystallinity level that is greater than or equal to the second bulk crystallinity level; and a plurality of discrete inner foamed microcellular layers and discrete unfoamed layers comprising:
  first and second discrete unfoamed skin outer layers;
  two substantially identical second inner foamed layers positioned immediately adjacent to the first and second discrete unfoamed skin outer layers;
  two substantially identical third inner foamed layers positioned immediately adjacent to the second inner foamed layers; and
  a fourth inner foamed layer positioned immediately adjacent to and interposed between the third inner foamed layers,
wherein closed cells within the plurality of discrete inner foamed microcellular layers have a diameter ranging from about 0.1 to about 100 microns, and
wherein the fourth inner foamed layer comprises cells having a size greater than cells of the second inner foamed layers, and the third inner foamed layers comprise cells having a size greater than cells of the fourth inner foamed layer.

2. The method according to claim 1 wherein the solid thermoplastic material sheet having a first bulk crystallinity level comprises a semi-crystalline polymer.

3. The method according to claim 2 wherein the semi-crystalline polymer is selected from the group consisting of PET (polyethylene terephthalate), PEEK (polyetheretherketone), PEN (polyethylene naphthalate), PBT (polybutylene terephthalate), PMMA (polymethyl methacrylate), PLA (polylactide), polyhydroxy acid (PHA), thermoplastic urethane (TPU), and blends thereof.

4. The method according to claim 2 wherein the semi-crystalline polymer is PET (polyethylene terephthalate).

5. The method according to claim 1 wherein the gas is carbon dioxide ($CO_2$).

6. The method according to claim 1 wherein the first bulk crystallinity ranges from about 1 to 9 percent.

7. The method according to claim 1 wherein:
  the heating step includes mechanically stretching the plasticized thermoplastic material sheet to initiate foaming, the heating and mechanical stretching occurring by transferring a selected amount of heat energy from a heat source sufficient to yield the foamed thermoplastic material sheet.

8. The method according to claim 7 wherein the heat source is an infrared radiant heater.

9. The method according to claim 1 wherein the plasticized thermoplastic material sheet, after the step of absorbing, has a concentration of the gas that is greater than about 0.5 percent by weight.

10. The method of claim 1 wherein the two substantially identical second inner foamed layers comprise high density closed cell layers immediately adjacent to the unfoamed skin outer layers and wherein the high density closed cell layers have closed cells with an average closed cell diameter ranging from about 5 to about 10 microns.

11. The method of claim 10 wherein the two substantially identical third inner foamed layers have a density lower than the second inner foamed layers and an average closed cell diameter ranging from about 30 to about 50 microns.

12. The method of claim 11 wherein the fourth inner foamed layer has a density lower than the third inner foamed layers and an average closed cell diameter ranging from about 20 to 40 microns.

13. The method of claim 1 wherein the first desorbing stage occurs for 24 hours.

14. The method of claim 13 wherein the second desorbing stage occurs for an hour.

15. The method of claim 1 wherein the desorbing step comprises maintaining the gas concentration at a level greater than about 0.01 percent by weight.

16. The method of claim 1 wherein a thickness of the second inner foamed layers is greater than a thickness of the third inner foamed layers; and
  wherein a thickness of the fourth inner foamed layer is less than the thickness of the third inner foamed layers.

17. A method of making a multi-layer foamed polymeric object comprising forming or thermoforming the foamed thermoplastic material sheet of claim 1 to yield the multi-layer foamed polymeric object, the multi-layer foamed polymeric object having a fourth bulk crystallinity level that is greater than or equal to the third bulk crystallinity level.

18. The method according to claim 17 wherein the fourth bulk crystallinity is at least 17 percent.

19. The method according to claim 17 wherein the multi-layer foamed polymeric object is in the shape of a cup or a tray.

20. The method according to claim 19 further comprising heat-setting the shaped multi-layer foamed polymeric object, to thereby further increase the bulk crystallinity of the shaped multi-layer foamed polymeric object to a fifth bulk crystallinity level, wherein the fifth bulk crystallinity level is greater than the first, second, third, and fourth bulk crystallinity levels.

\* \* \* \* \*